US010536946B2

(12) United States Patent
Zhu et al.

(10) Patent No.: US 10,536,946 B2
(45) Date of Patent: Jan. 14, 2020

(54) METHOD AND SYSTEM FOR PERFORMING NETWORK SLICING IN A RADIO ACCESS NETWORK

(71) Applicants: Peiying Zhu, Ottawa (CA); Jianglei Ma, Ottawa (CA); Wen Tong, Ottawa (CA)

(72) Inventors: Peiying Zhu, Ottawa (CA); Jianglei Ma, Ottawa (CA); Wen Tong, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/356,124

(22) Filed: Nov. 18, 2016

(65) Prior Publication Data
US 2017/0164349 A1    Jun. 8, 2017

Related U.S. Application Data

(60) Provisional application No. 62/264,629, filed on Dec. 8, 2015.

(51) Int. Cl.
| | | |
|---|---|---|
| H04W 72/00 | (2009.01) | |
| H04W 72/04 | (2009.01) | |
| H04W 76/11 | (2018.01) | |
| H04W 28/02 | (2009.01) | |
| H04W 40/20 | (2009.01) | |
| H04W 48/18 | (2009.01) | |
| H04W 76/10 | (2018.01) | |
| H04W 28/18 | (2009.01) | |
| H04W 88/10 | (2009.01) | |
| H04W 76/15 | (2018.01) | |

(52) U.S. Cl.
CPC ..... *H04W 72/048* (2013.01); *H04W 28/0247* (2013.01); *H04W 40/20* (2013.01); *H04W 48/18* (2013.01); *H04W 76/10* (2018.02); *H04W 76/11* (2018.02); *H04W 28/18* (2013.01); *H04W 76/15* (2018.02); *H04W 88/10* (2013.01)

(58) Field of Classification Search
CPC .................................................. H04W 72/048
See application file for complete search history.

(56) References Cited

U.S. PATENT DOCUMENTS

| 2013/0091552 A1 | 4/2013 | Cheng et al. |
| 2014/0073287 A1 | 3/2014 | Zhang et al. |
| (Continued) | | |

FOREIGN PATENT DOCUMENTS

| CN | 101039208 A | 9/2007 |
| CN | 101115292 A | 1/2008 |
| (Continued) | | |

OTHER PUBLICATIONS

NGMN Alliance NGMN 5G White Paper (Version 1.0) 3GPP 17, Feb. 17, 2015.
(Continued)

*Primary Examiner* — Justin Y Lee

(57) ABSTRACT

A method and system of allocating resources in a Radio Access Network that includes associating each of a plurality of services with a slice that is allocated a unique set of network resources and transmitting information in the Radio Access Network for at least one of the services using the slice associated with the at least one service.

26 Claims, 12 Drawing Sheets

(56) References Cited

U.S. PATENT DOCUMENTS

| | | | |
|---|---|---|---|
| 2014/0086177 A1 | 3/2014 | Adjakple et al. | |
| 2014/0198768 A1 | 7/2014 | Hahn et al. | |
| 2015/0281073 A1* | 10/2015 | Kotha | H04L 45/745 370/392 |
| 2015/0373195 A1 | 12/2015 | Wen et al. | |
| 2016/0006623 A1 | 1/2016 | Liu et al. | |
| 2016/0249353 A1 | 8/2016 | Nakata et al. | |
| 2017/0028566 A1 | 2/2017 | Knopf et al. | |
| 2017/0070266 A1 | 3/2017 | Ma et al. | |
| 2017/0070892 A1* | 3/2017 | Song | H04W 16/18 |
| 2017/0318468 A1 | 11/2017 | Aijaz | |
| 2019/0200315 A1 | 6/2019 | Tsai et al. | |
| 2019/0208452 A1 | 7/2019 | Connors et al. | |

FOREIGN PATENT DOCUMENTS

| | | | |
|---|---|---|---|
| CN | 101361328 A | 2/2009 | |
| CN | 101426258 A | 5/2009 | |
| CN | 101682532 A | 3/2010 | |
| CN | 102056113 A | 5/2011 | |
| CN | 103188729 A | 7/2013 | |
| CN | 103269282 A | 8/2013 | |
| CN | 103299580 A | 9/2013 | |
| CN | 104125091 A | 10/2014 | |
| CN | 104125347 A | 10/2014 | |
| CN | 104620653 A | 5/2015 | |
| CN | 104737609 A | 6/2015 | |
| CN | 104767677 A | 7/2015 | |
| CN | 104955172 A | 9/2015 | |
| CN | 105981413 A | 9/2016 | |
| EP | 2800413 A1 | 11/2014 | |
| JP | 2017200172 A | 11/2017 | |
| WO | 2014000602 A1 | 1/2014 | |
| WO | 2014166399 A1 | 10/2014 | |
| WO | 2014191053 A1 | 12/2014 | |
| WO | 2015056392 A1 | 4/2015 | |
| WO | 2017184837 A1 | 10/2017 | |

OTHER PUBLICATIONS

ETSI MCC Report of 3GPP RAN Workshop on "5G", RWS-150076 4GPP, Sep. 18, 2015.

NGMN Alliance NGMN 5G White Paper NGMN 5G White Paper. Feb. 17, 2015. pp. 1-125.

Abdelhamid, Ayman et al. Resource Scheduling for Heterogeneous Traffic in LTE Virtual. Jun. 30, 2015. pp. 1-6.

5G Systems, Ericsson White Paper, 284 23-3251 Uen, pp. 1 to 14, Jan. 2015.

R2-167585 Huawei, HiSilicon,"Key Issues for Support of Network Slicing in RAN",3GPP TSG-RAN WG2 Meeting #96,Reno, Nevada, USA, Nov. 14-18, 2016,total 6 pages.

S1-152226 Huawei,"Coordination of network slices",3GPP TSG-SA WG1 Meeting #71,Belgrade, Serbia, Aug. 17-21, 2015,total 2 pages.

* cited by examiner

METHOD AND SYSTEM FOR PERFORMING NETWORK SLICING IN A RADIO ACCESS NETWORK

RELATED APPLICATIONS

This application claims priority to and the benefit of U.S. Patent Application Ser. No. 62/264,629 filed Dec. 8, 2015, incorporated herein by reference.

TECHNICAL FIELD

The present invention relates to slicing of Radio Access Networks and creating end to end network slices in wireless networks.

BACKGROUND

In designing mobile networks, an architecture has arisen in which the network can be divided into a Core Network (CN) and a Radio Access Network (RAN). The RAN provides wireless communication channels to User Equipment (UE), while the CN is typically comprises of nodes and functions making use of fixed links. In the RAN, fronthaul and backhaul connections often rely on wired connections, although some wireless connections (typically between fixed points) are present. The RAN has different requirements and issues to address than the CN.

With planning for next generation networks, and researching techniques that can enable such networks, network slicing has drawn attention for the benefits that it can provide in the CN. When combined with such techniques as Network Function Virtualization (NFV) and Software Defined Networking (SDN), network slicing can allow for the creation of Virtual Networks (VNs) atop a general pool of compute, storage and communications resources. These VNs can be designed with control over in-network topology, and can be designed with traffic and resource isolation so that traffic and processing within one slice is isolated from traffic and processing demands in another slice. By creating network slices, isolated networks can be created with characteristics and parameters specifically suited to the needs of the traffic flows intended for the slice. This allows for a single pool of resources to be divided up to service very specific and disparate needs, without requiring that each slice be able to support the demands of the services and devices supported by other slices. Those skilled in the art will appreciate that a CN that has been sliced, may appear to the RAN as a plurality of core networks, or there may be a common interface, with each slice identified by a slice identifier. It should also be understood that while a slice may be tailored to the traffic patterns of the flows that it is intended to carry, there may be multiple services (typically with similar requirements) carried within each slice. Each of these services is typically differentiated by a service identifier.

In creating a sliced core network, it should be understood that typically the resource pool that is being drawn upon for slice resources is somewhat static. The compute resources of a data center are not considered to be dynamic on a short term basis. The bandwidth provided by a communications link between two data centers, of between two functions instantiated within a single data center does not typically have dynamic characteristics.

The topic of slicing within a Radio Access Network, has arisen in some discussions. RAN slicing poses problems not encountered with slicing in the CN. Issues associated with dynamic channel quality on the radio link to the UE, provision of isolation for transmissions over a common broadcast transmission medium, and how RAN and CN slices interact, have to be addressed to usefully enable Ran slicing in mobile wireless networks.

In Third Generation and Fourth Generation (3G/4G) network architecture, a base station, base transceiver station, NodeB, and evolved NodeB (eNodeB) have been the terms used to refer to the wireless interface to the network. In the following, a generic Access Point is used to denote the wireless edge node of the network. An Access Point will be understood to be any of a Transmission Point (TP), a Receive Point (RP) and a Transmit/Receive Point (TRP). It will be understood that the term AP can be understood to include the above mentioned nodes, as well as their successor nodes, but is not necessarily restricted to them.

Through the use of SDN and NFV, functional nodes can be created at various points in the network and access to the functional nodes can be restricted to sets of devices, such as UEs. This allows what has been referred to as Network Slicing in which a series of virtual network slices can be created to serve the needs of different virtual networks. Traffic carried by the different slices can be isolated from the traffic of other slices, which allows for both data security and easing of network planning decisions.

Slicing has been a used in core networks due to the ease with which virtualized resources can be allocated, and the manner in which traffic can be isolated. In a Radio Access Network, all traffic is transmitted over a common resource which has made traffic isolation effectively impossible. The benefits of network slicing in the Radio Access Network are numerous, but the technical obstacles to designing and implementing an architecture have resulted in a lack of network slicing at the radio edge.

SUMMARY

According to an example aspect, the present disclosure describes methods and systems of allocating resources in a radio access network (RAN) that includes associating each of a plurality of services with a slice that is allocated a unique set of network resources, and transmitting information in the RAN for at least one of the services using the slice associated with the at least one service.

According to a further aspect is a method for execution by an access point (AP) within a radio access network (RAN). The method includes receiving data for transmission to a User Equipment (UE), and wirelessly transmitting the received data to the UE using a set of transmission parameters associated with a RAN slice associated with the received data. In some example embodiments, the RAN slice associated with the received data is selected from a set of RAN slices supported by the AP. Furthermore, the RAN slice may be selected in accordance with a RAN slice identifier associated with the received data. In some configurations, the transmission parameters are selected in accordance with the selected RAN slice. In some embodiments, the set of transmission parameters are selected in accordance with an address of a gateway between the RAN and a core network. In some embodiments, the set of transmission parameters are selected in accordance with one of a core network identifier, a core network slice identifier and a service identifier associated with the received data. In some examples, at least one parameter in the set of transmission parameters is selected from a list comprising: radio frequency/time resources; a radio access technology; a transmission waveform; a frame length; and a numerology.

According to a further aspect, there is provided a network access point (AP) for transmitting data to a User Equipment (UE) over a radio channel in a radio access network (RAN). The AP includes a network interface for receiving data from a radio access network; a wireless network interface for transmitting data to the UE; a processor; and a non-transient memory for storing instructions. The instructions, when executed by the processor cause the network access point to: transmit data to the UE over the wireless network interface using a set of transmission parameters associated with a RAN slice, in response to receipt of the data for transmission to the UE over the network interface. In some example embodiments, the non-transient memory further stores instructions to select the transmission parameters in accordance with an address of a gateway from which the data is received. In some example embodiments, the non-transient memory further stores instructions to select at least one transmission parameter in the set in accordance with a RAN slice identifier associated with the data. In some configurations, the non-transient memory further stores instructions to select at least one transmission parameter in the set in accordance with one of a core network identifier, a core network slice identifier and a service identifier associated with the data. In some examples, at least one parameter is the set of transmission parameters is selected from a list comprising: radio frequency/time resources; a radio access technology; a transmission waveform; a frame length; and a numerology.

According to another aspect is a method for execution by a routing function in a radio access network (RAN), which includes receiving data traffic from a core network destined for a User Equipment (UE), and transmitting the received data traffic to a transmission point within a selected RAN slice associated with the received data traffic. In some configurations, the RAN slice associated with the received data traffic is selected in accordance with one of: an identifier associated with the core network; an identifier associated with a slice of the core network associated with the received data; and a service identifier associated with the received data. In some examples, the identifier associated with one of the core network and the slice of the core network is one of an address of a core network gateway function and a tunnel identifier. In various examples, receiving the data traffic includes one or more of receiving the data traffic from a gateway function within the core network and/or receiving the data traffic from a core network slice that the RAN slice can be pre-associated with. In some examples, the transmission point within the RAN slice is selected in accordance with information about the location of the UE with respect to the network topology. In some example embodiments, the method includes selecting a transmission point uniquely associated with the UE, and determining a set of constituent access points associated with the transmission point; wherein transmitting the received data comprises transmitting the received data to the set of constituent access points. In some examples, the step of transmitting includes modifying the received data to include a RAN slice identifier associated with the selected RAN slice prior to transmitting the data to the transmission point.

According to another aspect is a router for use in a radio access network (RAN) which includes a network interface for receiving and transmitting data, a processor, and a non-transient memory for storing instructions. When executed by the processor, the instructions cause the router to: transmit data traffic, over the network interface, to a transmission point associated with a selected RAN slice within the RAN, in response to receiving data traffic destined for a User Equipment (UE) over the network interface. In some examples, the instructions cause the router to select the RAN slice in accordance with one of an identifier associated with the core network; an identifier associated with a slice of the core network associated with the received data; and a service identifier associated with the received data. In some examples, the identifier associated with one of the core network and the slice of the core network is one of an address of a core network gateway function and a tunnel identifier. In some example embodiments, the instructions cause the router to select the transmission point in accordance with information about the location of the UE with respect to the network topology. In some examples, the instructions cause the router to select a transmission point uniquely associated with the UE; determine a set of constituent access points associated with the selected transmission point; and transmit the data to the transmission point by transmitting the data to the set of constituent access points. In some examples, the instructions cause the router to modify the received data prior to transmission to the transmission point to include a RAN slice identifier associated with the selected RAN slice.

In at least some example embodiments the methods and systems described can facilitate network slicing in a radio access network, providing benefits that include one or more of efficient use of RAN resources, isolation within in the RAN of different services, virtualization of RAN resources, and coordination of virtualized resources between the RAN and the Core network.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

Figure 1:
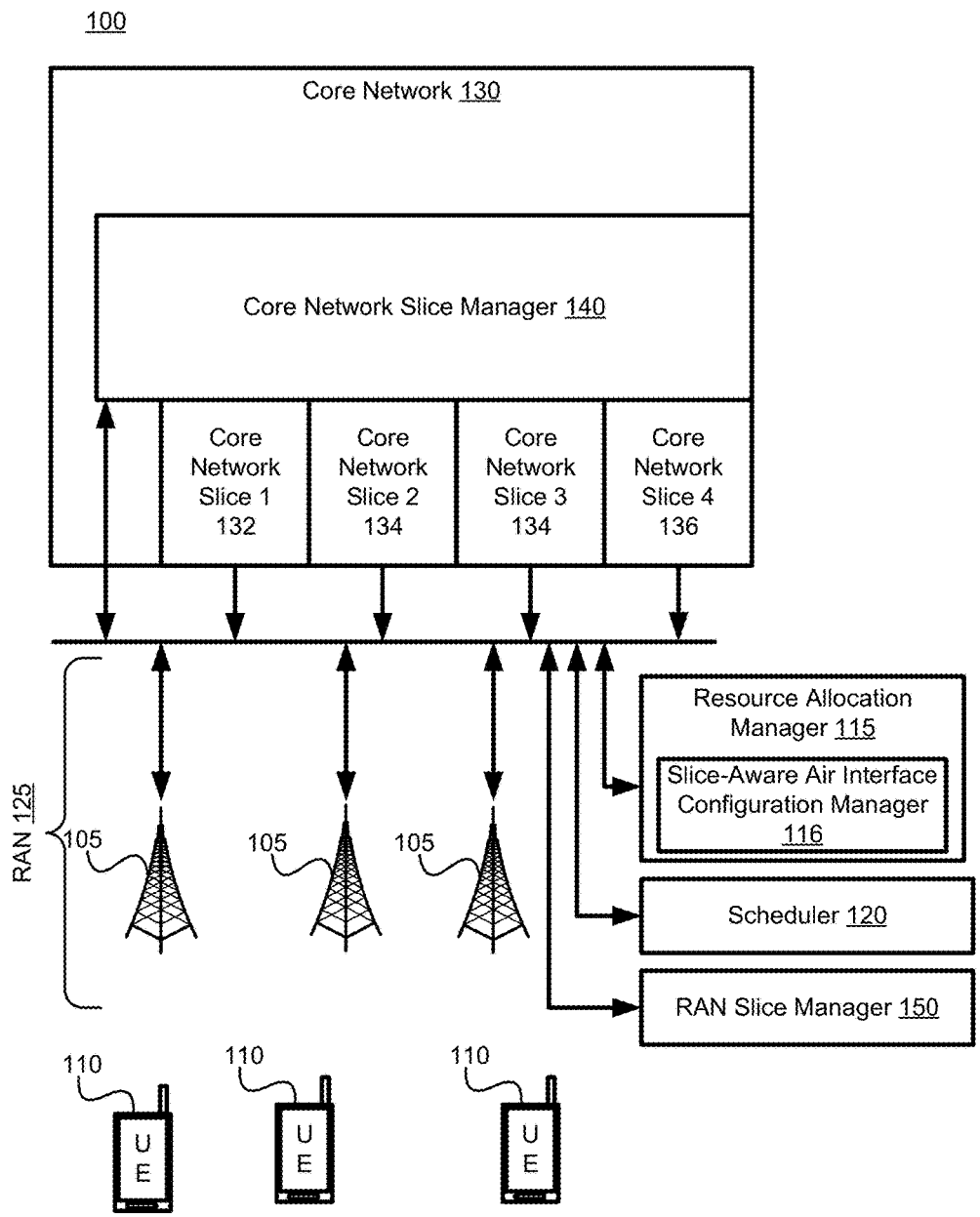
FIG. 1 is a schematic diagram of an example communications system suitable for implementing various examples described in the present disclosure.

Software Defined Networking (SDN) and Network Function Virtualization (NFV) have been used to enable network slicing in a physical core network. Network slicing involves allocating resources, such as compute, storage, and connectivity resources, to create otherwise isolated virtual networks. From the perspective of a network entity inside a slice, the slice is a distinct and contained network. Traffic carried on a first slice is invisible to a second slice, as are any processing demands within the first slice. In addition to isolating networks from each other, slicing allows for each slice to be created with a different network configuration. Thus, a first slice can be created with network functions that can respond with very low latency, while a second slice can be created with very high throughput. These two slices can have different characteristics, allowing for the creation of different slices to service the needs of specific services. A network slice is a dedicated logical (also referred to as virtual) network with service specific functionalities, and can be hosted on a common infrastructure with other slices. The service specific functionalities associated with a network slice can, for example, govern geographical coverage areas, capacity, speed, latency, robustness, security and availability. Traditionally, network slicing has been limited to the core network, in view of the difficulties in implementing slicing in a Radio Access Network (RAN). However example embodiments will now be described for implementing RAN slicing. In at least some examples, RAN slicing and network core slicing are coordinated to provide end-to-end slicing that can be used to provide service-specific network slices extending across the entire core network and RAN communications infrastructure.

Radio resources allocated to a RAN are typically a set of wireless network rights granted to a network operator which may include for example one or more specified radio frequency bandwidths within one or more geographic regions. A network operator typically enters into service level agreements (SLAs) with customers that specify the level of service that the network operator must provide. Services that are supported by a network operator can fall within a range of categories, including for example: basic mobile broadband (MBB) communications such as bi-directional voice and video communications; messaging; streaming media content delivery; ultra-reliable low latency (URLL) communications; micro Machine Type Communications (μMTC); and massive Machine Type Communications (mMTC). Each of these categories could include multiple types of services—for example intelligent traffic systems and eHealth services could both be categorized as types of URLL services. In some examples, a network slice may be assigned for a service for a group of customers (for example smart phone subscribers in the case of mobile broadband), and in some examples a network slice may be assigned for a single customer (for example, an organization that is providing intelligent traffic systems).

FIG. 1 is a schematic diagram of an example communications system or network 100, in which examples described in the present disclosure may be implemented. The communications network 100 is controlled by one or more organizations and includes a physical core network 130 and a Radio Access Network (RAN) 125. In some examples, the core network 130 and RAN 125 are controlled by a common network operator, however in some examples the core network 130 and RAN 125 are controlled by different organizations. In some embodiments, multiple RANs 125, at least some of which are controlled by different network operators, may be connected to a core network 130 that is controlled by one or more of the network operators or by an independent organization. Core Network 130 is sliced, and shown having CN Slice 1 132, CN Slice 2 134, CN Slice 3 136 and CN Slice 4 138. It should also be understood, as will be discussed in more detail below, that a plurality of core networks can make use of the same RAN resources.

An interface between the core network 130 and RAN 125 is provided to allow traffic from CN 130 to be directed towards UEs 110 through access points (APs) 105, which may be base stations, such as an evolved Node B (eNB) in the Long-Term Evolution (LTE) standard, a 5G node, or any other suitable nodes or access points. APs 105, also referred to as Transmit/Receive Points (TRPs), may serve a plurality of mobile nodes, generally referred to as UEs 110. As noted above, in the present description access point (AP) is used to denote the wireless edge node of the network. Thus, the APs 105 provide the radio edge of RAN 125, which may for example be a 5G wireless communication network. The UEs 110 may receive communications from, and transmit communications to, the AP's 105. Communications from the APs 105 to the UEs 110 may be referred to as downlink (DL) communications, and communications from the UEs 110 to the APs 105 may be referred to as uplink (UL) communications.

In the simplified example shown in FIG. 1, network entities within the RAN 125 may include a resource allocation manager 115, a scheduler 120, and a RAN slice manager 150, which may in some embodiments be under the control of the network operator who controls RAN 125. The resource allocation manager 115 may perform mobility-related operations. For example, the resource allocation manager 115 may monitor the mobility status of the UEs 110, may oversee handover of a UE 110 between or within networks, and may enforce UE roaming restrictions, among other functions. The resource allocation manager 115 may also include an air interface configuration function. The scheduler 120 may manage the use of network resources and/or may schedule the timing of network communications, among other functions. RAN slice manager 150 is configured for implementing RAN slicing, as described in greater detail below. It should be understood that in some embodiments, the scheduler 120 is a slice specific scheduler and is specific to the RAN slice, and not common to the RAN. Those skilled in the art will further appreciate that in some embodiments, some slices will have a slice specific scheduler, while other slices will make use of a common RAN scheduler. A common RAN scheduler may also be used to coordinate between slice specific schedulers so that the common RAN resources are properly scheduled.

In example embodiments, the core network 130 includes a core network slice manager 140 for implementing (and optionally managing) core network slicing. As shown in FIG. 1, Core Network 130 has four illustrates slices CN Slice 1 132, CN Slice 2 134, CN Slice 3 136 and CN Slice 4 138. These slices can, in some embodiments, appear to the RAN as distinct Core Networks. The UEs 110 may include any client devices, and may also be referred to as mobile stations, mobile terminals, user devices, client devices, subscriber devices, sensor devices, and machine type devices for example.

Next generation wireless networks (e.g. fifth generation, or so-called 5G networks) are likely to support a flexible air interface in RAN 125 that allows for the use of different waveforms, and different transmission parameters of each of the waveforms (e.g. different numerology for some of the supported waveforms), different frame structures, as well as different protocols. Similarly, to take advantage of a large number of APs 105, which may take the form of both macro and pico-cell sized transmission points operating in different frequency bands, it is possible that a 5G network will group a series of APs 105 to create a virtual transmission point (vTP). The coverage area of a vTP may be referred to by some as a hyper-cell. By co-ordinating the transmission of signals from the APs 105 in the virtual TP, the network 125 can improve capacity and coverage. Similarly, a grouping of APs 105 can be formed to create a virtual receive point (vRP) that allows for multipoint reception. By varying the APs 105 in the virtual groups, the network 100 can allow the virtual TP and RP associated with an UE 110 to move through the network.

From the perspective of a network operator, deploying network infrastructure can be very expensive. Maximizing the utilization of the deployed infrastructure, and the wireless resources, is of importance to allow network operators to recover their investments. The following disclosure provides systems and methods for enabling network slicing at the radio edge of RAN 125, and for facilitating routing of traffic between slices of the radio edge of RAN 125 and core network 130, which may also be sliced. In some examples, this can enable an end-to-end network slice, and allows network operators to then divide the network and provide service isolation in wireless connections within a single network infrastructure.

Figure 2:
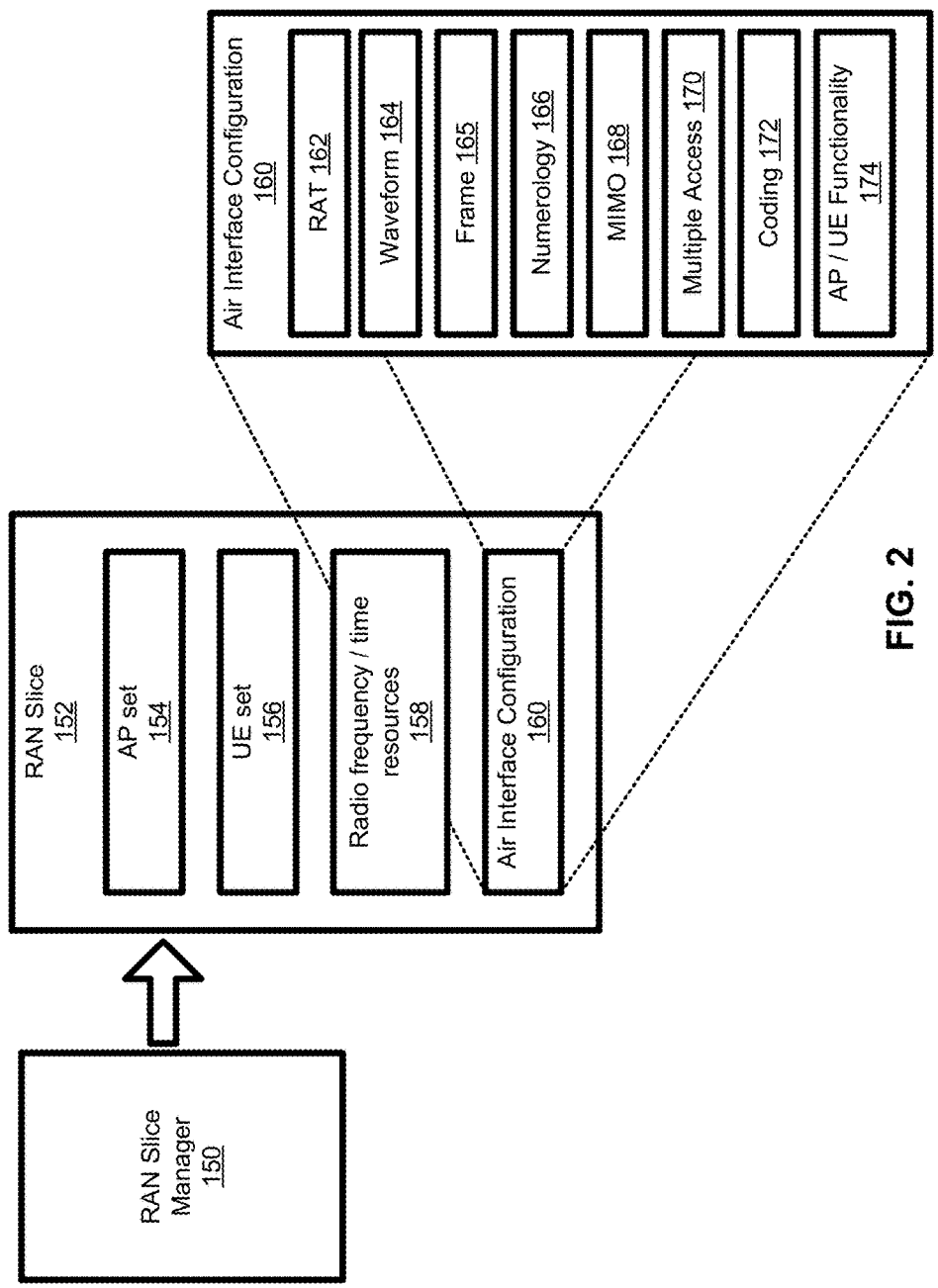
FIG. 2 is a schematic diagram illustrating an example set of parameters that are defined by a RAN slice manager for a service specific RAN slice instance according to example embodiments.

Referring to FIG. 2, in example embodiments the RAN slice manager 150 is configured to create and manage RAN slices 152. Each of the RAN slices 152 have a unique allocation of RAN resources. The RAN resources that are available for allocation can be categorized as: RAN access resources, which include the AP's 105 and UEs 110;
radio resources, which include:
wireless network frequency and time (f/t) resources 158, and
spatial resources based on the geographic placement of APs 105 associated with the slice and based on the directionality of transmissions if advanced antenna technologies are applied; and
radio air interface configurations 160 that specify how the radio resources and the access resources interface with each other.

The radio air interface configuration 160 can, for example, specify attributes in one or more of the following categories: the radio-access technology 162 to be used for the slice (e.g. LTE, 5G, WiFi, etc.); types of waveform 164 to be used (e.g. orthogonal frequency division multiple access (OFDMA), code division multiple access (CDMA), sparse code multiple access (SCMA) etc.); numerology parameters 166 for the specified waveforms (e.g. subcarrier spacing, transmission time interval length (TTI), cyclic prefix (CP) length, etc.); frame structures 165 (e.g. UL/DL partition configuration for TDD system), applicable multiple-input-multiple-output (MIMO) parameters 168; multiple access parameters 170 (e.g. grant/grant free scheduling); coding parameters 172 (e.g. type of error/redundancy coding scheme); and functionality parameters for APs and UEs (e.g. parameters governing AP handover, UE retransmission, UE state transition, etc.). It will be appreciated that not all embodiments may include the entire list of radio transmission functions describe above, and in some cases there may be overlap in some of the categories stated above—for example a specific waveform may be inherently defined by a specified RAT.

In example embodiments, the RAN slice manager 150 manages the allocation of RAN resources for the specific RAN slices 152 and communicates with resource allocation manager 115 and scheduler 120 to implement service specific RAN slices 152 and to receive information about RAN resource availability. In example embodiments, the RAN slice manager defines the RAN resources for RAN slices 152 based on slicing requirements received from the core network 130, and in particular the core network slice manager 140.

RAN slices are each instances that can be set up and maintained for varying durations, ranging from long term instances that may be set up and maintained indefinitely, to temporary RAN slice instances that may last only momentarily for a specified function.

In example embodiments, RAN slice manager 150 is configured to implement RAN slicing to effect one or more of the following functions: service isolation within a carrier, dynamic radio resource allocation taking slices into account, a mechanism for a radio access network abstraction, per-slice based cell association, a handover mechanism at the physical layer and a per-slice state machine. Those skilled in the art will appreciate that this list is neither exhaustive nor is it essential to have all the features to provide RAN slicing. RAN slicing in respect of these functions will now be described in greater detail.

In at least some examples, the RAN slices 152 are each associated with a specific service. In another embodiment, any or all of the RAN slices 152 can carry traffic associated with a set of services. Services which would require a RAN slice 152 with similar parameters and characteristics can be grouped together on a single slice to reduce the overhead of creating distinct slices. The traffic associated with the different services can be differentiated through the use of service identifiers, as will be well understood. As illustrated in FIG. 2, RAN slice 152 will be associated with a set of APs 105 nodes (AP set 154) and a set of receiving UEs 110 (UE set 156) communicating with each other using specified air interface configuration 160 and a set of radio frequency/time resources 158. The UEs 110 within UE set 156 are typically the UEs that are associated with services within the slice 152. By creating a slice, a set of resources is allocated, and the traffic in the slice is contained such that different services that use the RAN 125 can be isolated from each other. In this regard, in example embodiments, isolation means that communications that occur in respective contemporaneous RAN slices will not affect each other, and additional RAN slices can be added without impacting the communications occurring in existing RAN slices. As will be explained in greater detail below, in some example embodiments isolation can be achieved by configuring each RAN slice 152 to use a different air interface configuration 160 (including waveform numerology 166). By selecting an air interface configuration 160 based on the requirements of the slice, it may be possible to improve the performance of the slice, or to reduce the impact of the resource usage of the slice, this may be achieved through the use of waveforms that have better spectrum localization. For example, sub-band filtering/windowing can be applied at a receiver to reduce interference between adjacent sub-bands that apply different numerologies. As will be discussed further below, different RAN slices 152 can be associated with different sets of physical transmit and receive nodes.

Accordingly, those skilled in the art will appreciate that although slices can be differentiated by the allocated by radio time/frequency resources 158, they could also be differentiated by the assigned air interface configuration 160. For example, by allocating different code based resources 172, different slices can be maintained separately. In access technologies that make use of different layers, such as Sparse Code Multiple Access (SCMA), different layers can be associated with different slices. Slices may be separated from each other in a time domain, a frequency domain, a code domain, a power domain, or special domains (or any combination of the above).

In some embodiments, allocating a set of time/frequency resource pairings 158 to the slice allows the traffic intended for the slice to be transmitted over dedicated radio resources. In some embodiments, this could include the allocation of an entire frequency band at fixed time intervals to a slice, or it could include allocation of a dedicated subset of the available frequencies to the slice at all times. Both of these can provide service isolation, but they may be somewhat inefficient. Because such a scheduling of resources is typically predefined, there may be long periods of time between redefinition of the resources during which the allocated resources are not fully used. The redefinitions cannot be too frequent if there are devices that have long periods of being idle, or these devices would have to frequently re-connect to the network to obtain this information. Accordingly, in example embodiments, service isolation over a common carrier (for example within the same carrier frequency) allows independent co-existence of multiple services within the same carrier. Physical and other resources can be dedicated on slice by slice basis within a set of dedicated slice resources. As noted above, in 5G networks, it is anticipated that a number of different protocols and waveforms, some of which may have a number of different numerologies, can be supported.

In some examples, resource allocation manager 115 includes a slice-aware air interface configuration manager (SAAICM) 116 that controls AP 105s based on the air interface configuration assignments made to the RAN slices 152 by RAN slice manager 150, thus allowing a waveform and numerology to be dedicated to a slice 152. All nodes (AP's 105 or UEs 110) transmitting data in the slice are then allocated transmission resources by network scheduler 120, based on the network f/t resource parameter set assigned by at least one of RAN slice manager 150, and the nodes transmitting within the allocated AP resources 154 and UE resources 156. This allows a network entity or entities such as the RAN slice manager 150 and resource allocation manager 115 to adjust the resource allocation dynamically, as discussed in greater detail below. The dynamic adjustment of resources allocations allows a slice 152 to be provided a minimum level of service guarantee without requiring that the resources used to provide this level of service are dedicated exclusively to the slice. This dynamic adjustment allows resources that would otherwise be unused to be allocated to other needs. Dynamic dedication of the physical resources may allow a network operator to increase the usage of the available nodes and wireless resources. A network entity or entities, such as the RAN slice manager 150 and resource allocation manager 115 can assign parameters to each slice based on the requirements of the service supported by that slice. In addition to the service isolation discussed above, the generation of a slice specific to a service (or a class of services) allows for the RAN resources to be tailored to the supported services in some embodiments. Different access protocols can be offered for each slice, allowing for example, different acknowledgement and re-transmission schemes to be employed in each slice. A different set of Forward Error Correcting (FEC) parameters can also be set for each slice. Some slices may support grant free transmissions, while others will rely on grant based uplink transmissions.

Accordingly, in some example embodiments the RAN slice manager 150 is configured to enable service isolation by differentiating the air interface configuration 160 for each service-centric RAN slice 152. In at least some examples, the differentiation amongst the attributes of different air interface configurations 160 assigned by the RAN slice manager 150 to different RAN slices 152 can provide service isolation even when the other RAN slice parameter sets (for example one or more of the AP set 154, UE set 156, and Network f/t set 158) are similar.

Figure 3:
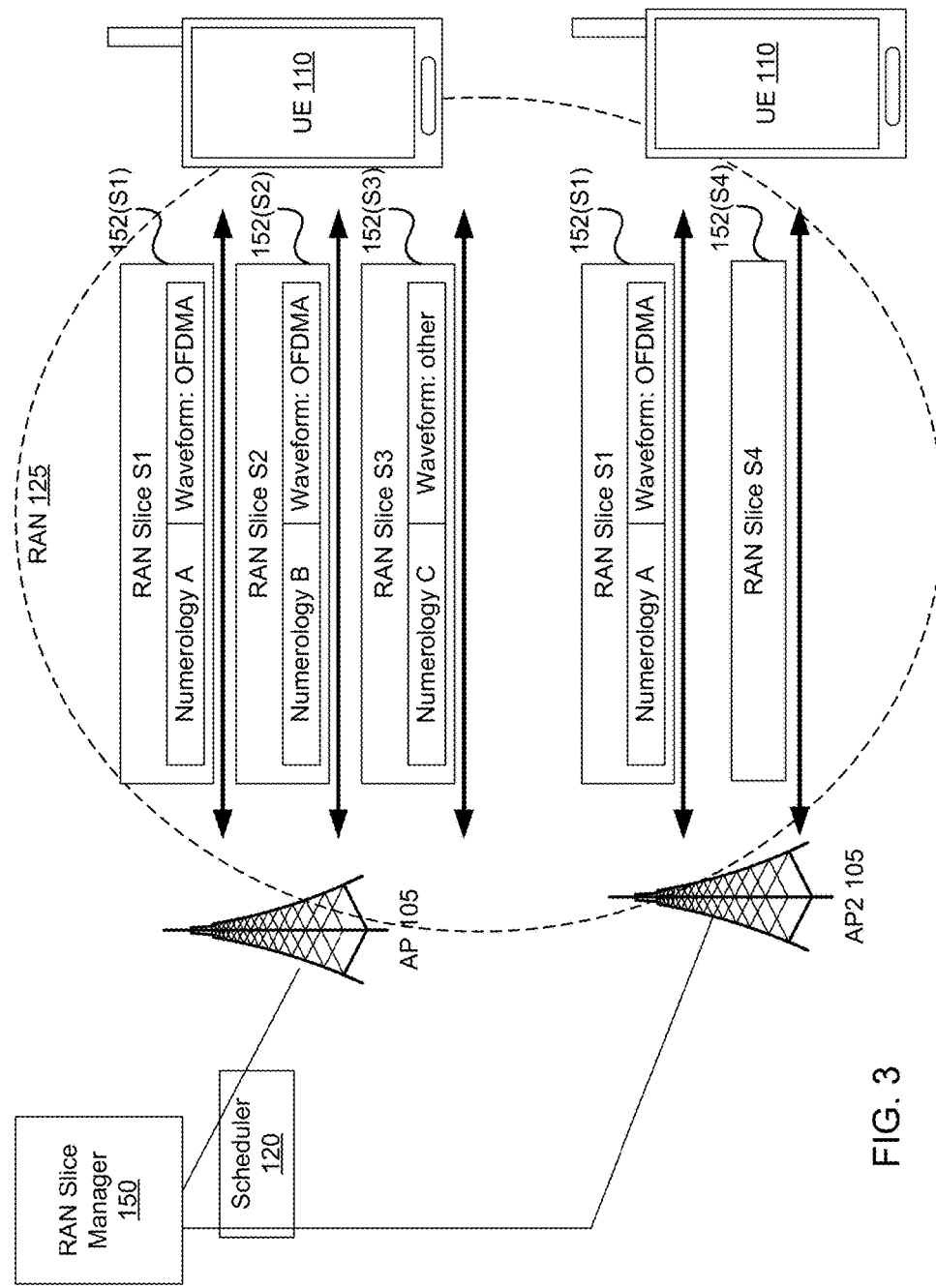
FIG. 3 is a schematic diagram illustrating an example of slice based service isolation in a RAN.

FIG. 3 illustrates an example of service isolation within a carrier. In particular, in the example of FIG. 3, three services S1, S2 and S3 are each assigned a respective RAN slice 152(S1), 152(S2) and 152(S3) by RAN slice manager 150 for use in a common frequency range allocation (common carrier) in which the RAN slices have been assigned adjacent frequency sub-bands in RAN 125. In the example of FIG. 3, the RAN slices 152(S1), 152(S2) and 152(S3) assigned to the three services S1, S2 and S3, all include identical allocations in respect of the AP set 154 and UE set 156, and having similar network f/t resources 158 with adjacent sub-band allocations. However, the air interface configurations 160 allocated to the three services S1, S2 and S3 are differentiated in order to provide service isolation, even though the services are intended to operate using similar carrier frequency resources (namely, adjacent sub-bands as specified in network f/t resources 158). In the illustrated example the differentiation is provided in one or both of the waveform 164 and numerology parameter 166 assignments. The numerology parameters define parameters of the specified waveform. For example, in the case of an OFDMA waveform, the numerology parameters include the sub-carrier spacing, the length of a cyclic prefix, the length of an OFDM symbol, the duration of a scheduled transmission duration and the number of symbols contained in a scheduled transmission duration.

Specifically, in the example of FIG. 3, RAN slice 152(S1) and RAN slice 152(S2) have each been allocated the same waveform function (OFDMA), but have each been allocated different numerology parameters (Numerology A and Numerology B, respectively) to apply to the waveform function. For example, Numerology A and Numerology B may specify different TTI lengths and subcarrier spacing for the respective OFDMA waveforms. The third RAN slice 152(S3) has been allocated a different multiple access function 170 (for example SCMA), and a set of numerology parameters suitable for the waveform associated with the different multiple access function (Numerology C).

In some examples, the different transmission function 160 parameters allocated to the different RAN slices may sufficiently distinguish the different services such that the RAN slices can be implemented in overlapping frequencies in overlapping times. However, in some embodiments, time differentiation may also be required, which may for example be implemented by scheduler 120.

In some example embodiments, service isolation can also be implemented through differentiation in the access resources allocated to different RAN slices. For example, the AP set 154 assigned to different RAN slices 152 can be sufficiently different that geographic isolation occurs. Also, as noted above, different network frequency/time resources 158 can be used to isolate different RAN slices.

In example embodiments, the parameters set for RAN slice instances can be dynamically varied based on real-time network demands and available resources. In particular, in example embodiments, RAN slice manager 150 is configured to monitor the real-time demands and available resources across RAN 125 and the RAN slices 152 and based on the monitored information and the performance requirements defined for specific services (for example the performance requirements set out in an SLA), the RAN manager 150 can re-define the allocations it has made in respect of the slices.

FIG. 3 further illustrates the presence of AP2 105 in RAN 125. AP2 105 serves a different UE 110 than is shown served by AP 105, and supports services in Slice 1 152(S1) (which is one of the slices supported by AP 105), and Slice 4 152(S4). The parameters of Slice 4 152(S4) are not illustrated, but they should be understood to be different than those of Slice 1 152(S1). A UE 110 connecting to Slice 1 152(S1) can thus be served by either or both of AP 105 and AP2 105. It should also be understood that not all APs within a single RAN need to support the same set of slices.

Figure 4:
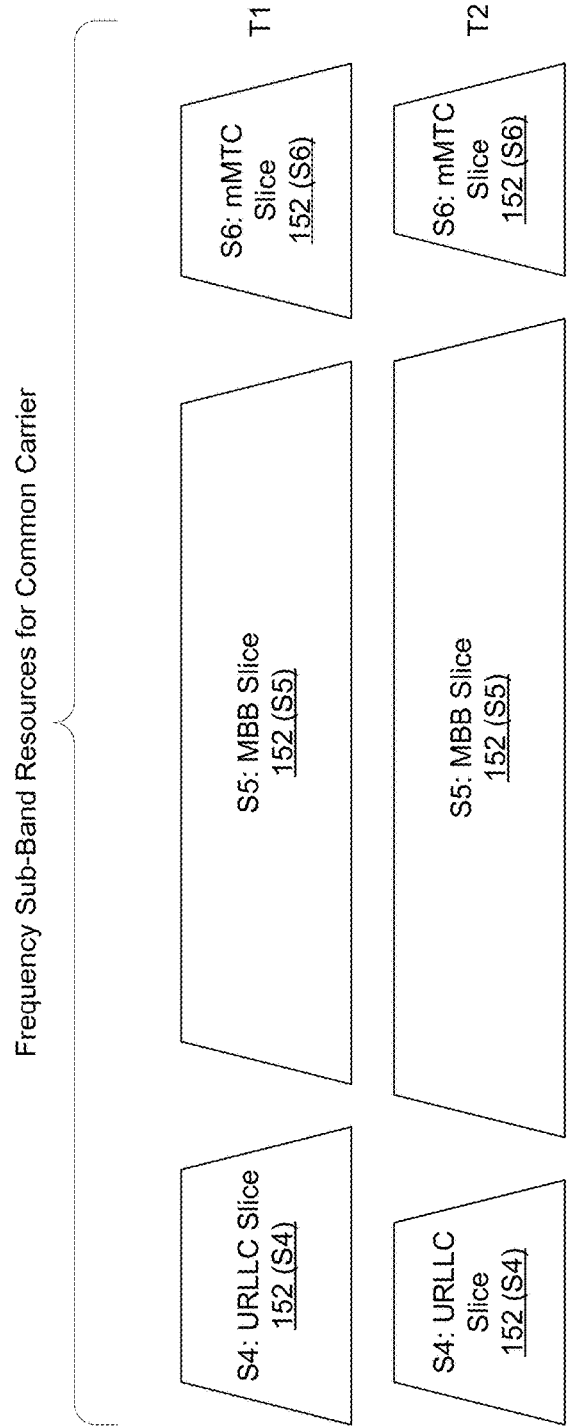
FIG. 4 is a schematic diagram illustrating dynamic slice allocations for different services on a common carrier according to example embodiments.

FIG. 4 schematically illustrates a set of RAN resources associated with a common carrier (for example RAN 125), and, in particular, radio frequency/time (f/t) resources. In the example of FIG. 4, resource allocation manager 115 allocates f/t resources, in accordance with instructions received from RAN Slice Manager 150, to slices 152(S4), 152(S5), and 152(S6) that are each associated with a specific service S4, S5 and S6, respectively. A service S4 may be directed towards ultra-low-latency-reliable communications (ULLRC) devices is allocated resources associated with ULLRC slice 152(S4), a service S5 for mobile broadband (MBB) is allocated resources associated with MBB slice 152(S5) and a service S6 for massive Machine Type Communications (mMTC) is allocated resources associated with mMTC slice 152(S6). As represented in FIG. 4, the allocation can be dynamic as the assignment of relative frequency resources within the common carrier RAN resources 200 can change from time T1 to time T2. Additionally, between times T1 and T2 different resource allocations for each slice 152 can be made by setting different radio air interface configurations 160 for each slice, including one or more of numerology, waveforms and protocols. Other RAN slice resource parameters, including for example physical access resources (AP set 154 and UE set 156), can also be allocated differently to the different slices between times T1 and T2. Although the frequency resources are illustrated as being continuous in FIG. 4, the frequency sub-bands assigned to the respective slices need not be continuous and within each slice 152 the assigned frequency sub band resources may be non-continuous. Although one MBB slice 152(S5) is shown in FIG. 4, there may be multiple MBB slices, as well as additional non-MBB slices. As will be appreciated from the above description, by using different numerologies, different waveforms and different protocols for different slices 152 (S4), 152(S5), and 152(S6), traffic from each slice 152(S4), 152(S5), and 152(S6) is effectively isolated. Functions and nodes within each slice (e.g. the devices (UEs 110) or entities (APs 105) that support the service associated with the slice) only know their own numerology, and this allows for isolation of their traffic. In example embodiments, in order reduce interference between the channel frequency resources assigned to different slices with different numerologies, sub-band filtering or windowing is applied at the receiving AP 105 or UE 110 to further enhance localization of the waveforms with different numerologies. In example embodiments, in order to accommodate varying levels of functionality at AP's 105 and UEs 110, the RAN slice manager may allocate sets of alternative air interface configurations 160 to each RAN slice 152, with the resource allocation manager 115 or AP 105 selecting the appropriate transmission functions at the time of transmission.

Radio f/t resources can be viewed as two dimensions in a resource lattice. In FIG. 4, the differing physical sizes of the blocks represent relative use of the radio resources in RAN 125 by services S4, S5 and S6 as dictated by the slice allocations made by RAN slice manager 150 and implemented by Resource Allocation Manager 115 and Scheduler 120. By using a scheduling method that allows for variations in the lattice assignments and different waveforms to be transmitting in different resource blocks in the lattice, dynamic allocation of the resources can be performed. A flexible lattice combined with the ability to assign different transmission function resources such as different waveforms with different numerologies, provides an added dimension of control. Radio f/t resource assignment can be changed dynamically according to the change of the loading of different slices.

One skilled in the art will appreciate that resources can be allocated to slices 152 to account for the very different traffic profiles that different slices may have. For example, mobile broadband (MBB) connections are sporadic, but very high volume, while Machine Type Communications (MTC) devices typically generate traffic profiles that have a large number of devices communicating small amounts of data at fixed intervals, or in response to an event, and devices connecting to a URLLC service generate high volume traffic that may be quite consistent over the limited time period in which they are active, and may be resource intensive due to the need for both low latency and reliability. Instead of dedicating resources to either ULLRC deployments, or to massive MTC deployments, resulting in unused resources when they are not generating traffic, the resources allocated to other services, such as MBB, can be increased while the URLLC and mMTC services are not consuming their allocation of resources. An example of such a change in allocation is illustrated in FIG. 2 in which the portion of resources 200 allocated to MBB slice 152(S5) is increased at time T2 relative to time T1, whereas the portion of resources 200 allocated to ULLRC slice 152(S4) and mMTC slice 152(S6) is decreased at time T2 relative to time T1. Different waveforms can be selected for different types of connections, and different numerologies for a single waveform can be used to differentiate between two slices serving similar connection types (e.g. two MTC services could both use the same waveform but with different numerologies) to maintain both service isolation and efficient use of the spectrum resources.

In at least some examples, RAN slices can be used to decouple UEs 110 from a physical AP 105 and provide a layer of radio access network abstraction. For example, different RAN slices 152 can be assigned different AP sets 154, such that UE 110 can maintain a first session for a first service with a first AP 105 using a first RAN slice 152(S1), and also maintain a second session for a second service with a second AP 105 using a second RAN slices 152(S2). Such a configuration allows APs that that are most suitable for the specific services to be used. It should be understood that a set of APs can be grouped together to form a virtual access point. The service area of the virtual access point can be represented as the union of the service areas of the constituent APs. The vAP can be assigned an AP identifier. The vAP can be specialized so that it is either a transmit or receive point (vTP, vRP). A plurality of different vAPs can have overlapping memberships so that each vAP is composed of a plurality of different physical APs, with some of the physical APs being part of different vAPs. Some vAPs may have identical memberships to other vAPs.

Figure 5:
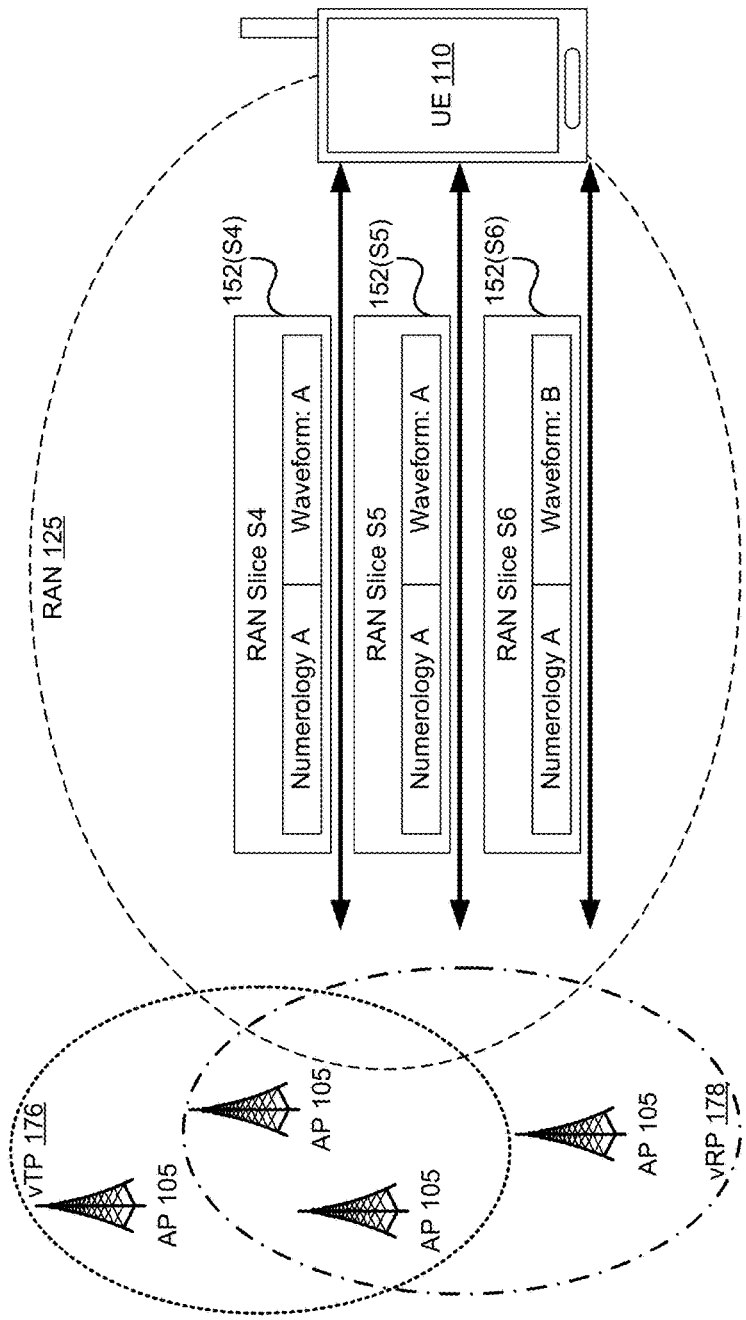
FIG. 5 is a schematic diagram illustrating a further example of slice based service isolation in a RAN.

In some embodiments, the RAN slice manager 150 may be configured to allocate both logical access resources and physical access resources to a RAN slice 152. For example, with reference to FIG. 5, there are a number of APs 105. Instead of each AP 105 operating independently, they can be used to create a virtual AP as discussed above. A virtual TP 176 and a virtual RP 178 can be created with differing, but overlapping sets of APs. Different vTPs and vRPs can be created for each slice. In addition to allocating different physical resources to a slice, the RAN slice manager 150 can allocate logical resources such as vTP 176 and vRP 178 to each slice. United States Patent Publication No. US2015/0141002 A1 entitled "System and Method for Non-Cellular Wireless Access"; United States Patent Publication No. US2014/0113643 A1 entitled "System and Method for Radio Access Virtualization" and United States Patent Publication No. US2014/0073287 A1 entitled "System And Method For User Equipment Centric Unified System Access In Virtual Radio Access Network", which are incorporated herein by reference, describe wireless networks in which UEs are associated with virtual TPs and RPs. In example embodiments, aspects of the virtualization and abstraction methodologies disclosed in these patent publications can be performed in respect of RAN slices to implement the slice specific virtualization and abstraction as described below.

In some embodiments, various devices (UEs 110) connecting to wireless network (RAN 125) will each participate in one or more different services (e.g. ULLRC service S4, MBB service S5, mMTC service S6), and each service can be assigned a different RAN slice 152. Resource allocation manager 115 can assign different slices to each virtual TP 176 or RP 178 to be adjusted along with demand. For example, a UE 110 that supports multiple services, such as both an MBB service, and an ULLRC service used to relay information such as that generated by a heart rate monitoring service, could transmit data associated with each of these services on different slices. Each slice could be assigned different encoding formats, and may be transmitted to the respective slices using different virtual RPs 178. The UE 110 could provide an indication of the slice 152 that is being used to the RAN slice 125 when there was data to transmit.

As a UE 110 moves, it may remain connected to the same virtual transmit point/receive point TP/RP 176,178, but the physical access points (APs 105) in the virtual access point TP/RP 176,178 will change. Furthermore, as a UE 110 moves a greater distance, it may be possible that the physical AP or radio t/f resources initially used are no longer available to the RAN 125. This can happen when the UE 110 travels sufficiently far that the spectrum allocated to the slice by the carrier is no longer available, or it could happen if the network operator makes use of infrastructure owned by another entity in one area, and cannot access the same resources in another. In the latter case, it may also be that the particular waveform assigned to the slice 152 for the UE 110 to use while transmitting over the RAN 125 is no longer available. In such a case, resource allocation manager 115 can notify the UE 110 that the transmission parameters will change at a certain geographic point. This may, in some embodiments, be performed as part of a handover procedure. It should also be understood that when a virtual TP/RP 176,178, or other vAP, is associated with a UE 110 on a per-slice basis, there may be occasions in which a handover occurs for one slice, but not another. This may occur in a number of different scenarios, including ones in which a UE 110 connects to a first service provider for a first service in a defined slice, and connects to a second service provider for a second service in another defined slice. In such a scenario, it is likely that the boundaries between APs or vAPs will vary between the service providers. In a scenario in which both services are provided through the same provider (or at least access services are provided by the same provider), boundaries between APs that are slice specific may not align, which will result in a per-slice handover.

In some examples, waveform parameters 164 could be changed when a UE 110 is handed over to (or otherwise served by) a different TP 170 operating in different frequency bands. A RAN slice 152 may have two alternative TPs 176 assigned to it for serving a UE 110, with one TPs 176 operating in a high frequency band, such as the mm band, and the other TP 176 operating in a lower frequency. The switch between different frequency bands, and corresponding switch between the APs used to serve the UE 110 for the slice 152, can be dynamic depending on a scheduling decision made at scheduler 120 and implemented by resource allocation manager 115.

By having the UE 110 connect to virtual access points TP/RP 176,178, the UE 110 can be logically decoupled from the actual physical infrastructure. This can mitigate problems associated with cellular handover, and cell edge interference. Different sets of physical APs 105 can be allocated to the virtual TPs 176 and virtual RPs 178, so that different slices can be served by different sets of hardware resources. This could allow a network operator to dedicate expensive and high capacity access points to services such as MBB, and lower cost APs 105 to services such as MTC services. Additionally, allocating TPs 176 and RPs 178 as separate logical entities can be used to decouple the Uplink and Downlink data paths, which may, in some circumstances, allow for better usage of the network infrastructure. If a given RAN slice 152 is dedicated to MTC devices that generate uplink traffic at fixed intervals, but are rarely sent any downlink traffic, the slice can be served by a set of virtual RPs 178 that is designed to be more robust than virtual TPs 176. This allows for resource allocation to serve the needs of service assigned to the RAN slice 152, to a finer grained level than would be possible if APs are assigned in their entirety (as would be required in a conventional LTE network where an eNodeB would be allocated and would provide bi-directional service).

The creation of virtual TPs 176 and RPs 178 may also be referred to as the generation of a hypercell. A hypercell allows for multiple physical APs 105 to work together to serve a UE 110. The hypercell can be associated with both a UE 110 and a RAN slice 152. This allows for a UE 110 to communicate with different hypercells in each slice. Each hypercell can then be configured for the specific needs of the slice that it is associated with. For example a UE 110 may communicate with a first hypercell (TRP) in respect of one first service-centric RAN slice 152(S4), and with a second hypercell for traffic associated with a second service-centric RAN slice 152(S5). The slices that carry traffic associated with an MTC service may be directed to serving stationary MTC devices (in the case where UE 110 is an MTC device). A slice dedicated to stationary MTC devices can be designed to be stable and relatively unchanging in their membership. Other slices, such as those dedicated to mobile MTC devices, such as intelligent traffic systems devices, and other such mobile services, can be configured to accommodate greater mobility. The slice that supports stationary MTC devices may also be designed to have limited function in the mobility management function (e.g. a Mobility Management Entity), due to the limited mobility of the supported devices. It should be understood that although the use of hypercells allows for a reduction in the number of handovers, handovers may not be completely eliminated. Handovers may happen when the waveform and numerology assigned to a slice in the hypercell are not available or supported at all points along the path of a mobile UE. By requiring a handover to a new hypercell, the network may be able to ensure that the new slice specific information is transmitted to the UE 110.

As noted above, when different hypercells are used to serve different slices, a UE 110 may undergo a handover in a first RAN slice 152, without necessarily having to undergo a handover in another RAN slice 152. In some examples, RAN 125 may encompass network resources that are allocated among multiple network operators, with the different network operators each supporting different hypercells. Because they are served by different hypercells, different network operators can provide service support to the same UEs 110 for different service-based RAN slices 152. This allows network operators to provide different services, and for customers (either users or service operators) to select different network operators for different RAN slices 152 based on cost, coverage, service quality and other factors. Accordingly, in some examples, a UE 110 accesses a first service using a first RAN slice 152 that supported by a first network operator, and the same UE 110 can then access a second service using a second RAN slice 152 that supported by a second network operator.

Figure 6:
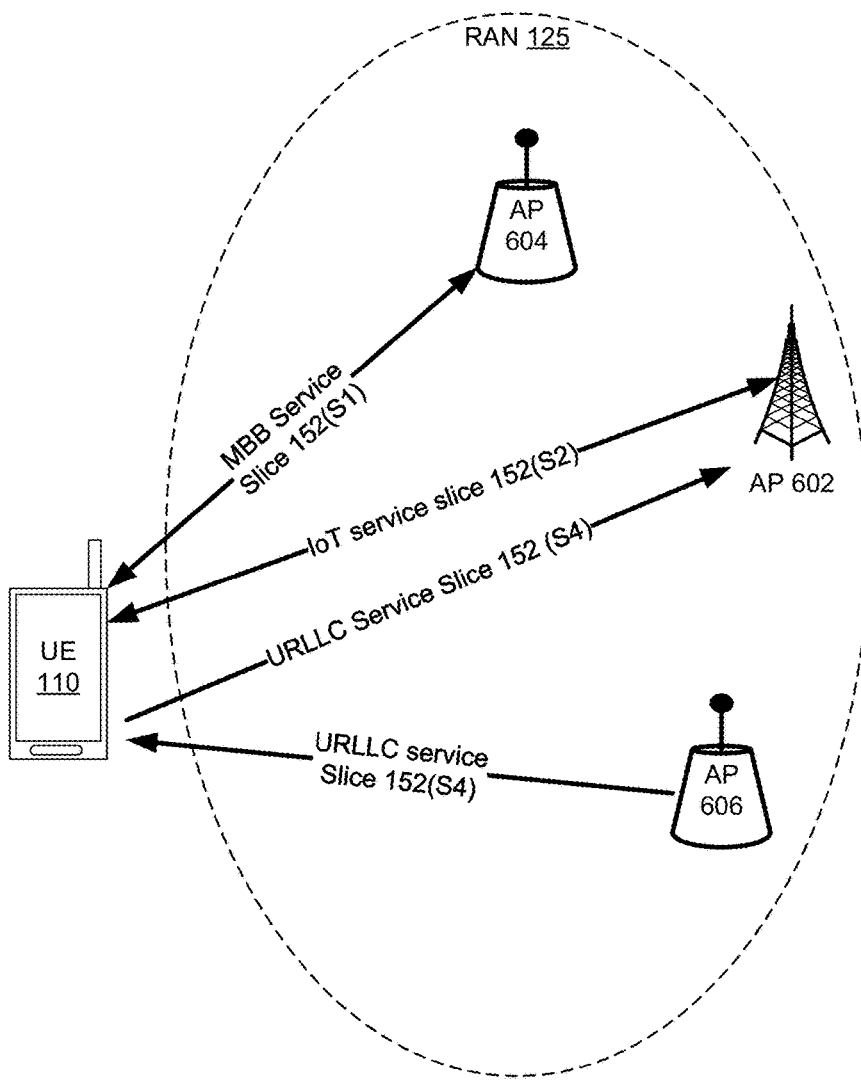
FIG. 6 is a schematic diagram illustrating a UE connecting to multiple slices over different access technologies.

Another example of the assignment of different access resources to different slices 152 will now be described with reference to FIG. 6. As discussed above, and as shown in FIG. 6, a single UE, such as UE 110 can connect to different access points (both physical and virtual) for different services. Although APs 602, 604 and 606 are illustrated as physical APs, it should be understood that they can also represent a virtual AP with several constituent APs. In some examples, RAN 125 is a heterogeneous network with different types of APs, and possibly supporting different RATs. AP 602 is an access point, also referred to as a macrocell, that can provide a wide coverage area, and typically provides access services in lower frequency bands. AP 602 would typically connect directly to the core network 130 and support a set of RATs (for example HSPA, LTE, 5G). Access points 604 and 606 can be APs directed to providing a smaller coverage area, and often referred to as small cells, picocells, and/or femtocells. APs 604 and 606 may connect to the core network 130 indirectly (for example through the Internet, through UE's that serve as relay devices, or through a fixed wireless connection to AP 602). In some implementations, AP 604 and 606 may connect directly to the core network. APs 604 and 606 may provide service in higher frequency band, such as mmWave, and/or they may support a different set of RATs (for example WiFi or access technologies dedicated to higher frequency APs). As shown in FIG. 6, where a heterogeneous network is available, different access technologies, or different waveforms, can be used, in conjunction with different access points, for access to different slices. The UE 110, when in the service range of AP 604, may rely upon AP 604 to an MBB slice 152(S1). This may provide the UE 110 with higher speed or lower cost connectivity, and it may remove a high bandwidth connection from a larger AP such as AP 602. UE 110 may also connect to an IoT service for an MTC function. MTC connections may be served by an IoT slice 152(S2) that is accessed through AP 602 (which provide macrocell coverage). Macrocell coverage is often more ubiquitous, and can better support a larger number of devices at a given time than smaller APs such as AP 604. This increased coverage and ability to support a larger number of devices may come at the expense of lower data rates in comparison to smaller access points 604. As MTC devices often require low bandwidth connections, a large number of them may be serviced in IoT service slice 152(S2) through a connection to AP 602. UE 110 may also participate in a service that requires a URLLC connection, which is supported by URLLC service slice 152(S4). Downlink traffic in the URLLC slice 152(S4) may be transmitted in a high-frequency band by AP 606 which acts as a TP. However, to ensure that uplink traffic is reliably delivered, and is not subjected to handover between a large number of APs with smaller coverage areas, the uplink traffic in this slice can be directed to AP 602. It should be understood, that each AP may be represented by a virtual representation within each slice, so that uplink traffic in slice 152(S4) and uplink traffic in slice 152(S2) are sent to different logical vRPs, each of which are representations of the same physical AP. In 3G/4G networks, a UE 110 is typically connected to one RAN access point at a time, and all services are routed over the same connection. By supporting simultaneous connections to different access points (both real and virtual), different slices can be isolated across the common access medium. It will be understood by those skilled in the art that different waveforms can be used by the different slices (e.g. one slice may use an Orthogonal Frequency Division Multiple Access (OFDMA) waveform, while a second slice uses another waveform, such as a Sparse Code Multiple Access (SCMA) waveform), or both slices could use the same type of waveform with different numerologies (e.g. both could use OFDMA, but with different spectrum masks, different resource block sizes etc.). It will also be understood that the TTIs for each slice can be different, but in some embodiments will be multiples of a base TTI value.

In example embodiments, RAN slice manager 150 will allocate one AP set (or TP/RP sets) and a corresponding RAT or set of RATs to a first RAN slice 152, and different AP set (or TP/RP sets) and corresponding RAT or set of RATs to a second RAN slice. In some examples, overlapping sets of physical or virtual access points may be allocated to each RAN slice, but with different use priorities. For example MBB service slice 152(S1) will be allocated access points 604 as its primary RAN access with macro access points 602 as a backup; conversely IoT service slice 152(S2) will be allocated only macro access points 602 for its RAN access.

As described above, in at least some examples, each RAN slice 152 will effectively operate as a distinct virtual network, indistinguishable from a physical network to most network nodes. In some embodiment, each RAN slice 152 can provide network resources tailored to the needs of the service that operates within it. This may include the provision of both data and control planes in the network 100. Each slice may be provisioned with a number of network functions that may operate as state machines. A scheduler may be represented as a state machine within a slice to provide scheduling in grant-based and grant-free transmission environments. In a slice, it may be determined that grant-based transmissions will be used for transmission (e.g. a slice that supports MBB), while another slice may allow for grant free transmission (e.g. slices that support MTC or Internet of Things (IoT) devices). It is also possible for a slice to accommodate both grant free (or contention based) and scheduled uplink transmissions. In some implementations, the differing demands on the schedulers may result in the demands on a scheduler being very sufficiently different between slices that it may be advantageous for each slice to have its own scheduling function (or set of functions). This could be provided by a single scheduler that is represented within each slice as a logical scheduling state machine. Those skilled in the art will appreciate that the access parameters, the waveform, numerology and other slice specific parameters can be managed by the different state machines in either of the UE and network entities associated with the slice. Thus, a UE that is connecting to multiple slices may serve as a platform for multiple state machines.

A UE 110 that connects to different slices may support a different set of state machines for each slice that it connects to. These state machines will preferably run simultaneously, and there may be an arbitrator to ensure that contention for access to physical resources in the UE is handled. The different state machines within a UE may result in a UE that performs both grant free and scheduling based transmissions. There may also be, within a UE, a function that serves to coordinate the operation of the plurality of state machines.

Examples of state machine enabled UEs 110 and supporting networks are described in United States Patent Publication No. US2015/0195788 A1 entitled "System and Method For Always On Connections in Wireless Communications System", United States Patent Publication No. US 2016/0227481A1 entitled "Apparatus And Method For A Wireless Device To Receive Data In An Eco State", and U.S. patent application Ser. No. 15/165,985, entitled "System And Method Of UE-Centric Radio Access Procedure" all of which are incorporated herein by reference. In example embodiments, the state machine related functionality described in the above documents are implemented at the UE 110 and the network on a slice by slice basis rather than on a device level basis. By way of example, in one embodiment RAN 125 and UE 110 are configured to support different operating states for UE 110 in respect of each RAN slice 152(S1) and 152(S2), with each operating state supporting different UE functionality. In particular, in one example the UE 110 is configured to implement a state machine that can transition between two different states in respect of each RAN slice 152(S1) and 152(S2), namely a first "Active" state and a second, energy economizing, "ECO" state. In example embodiments, a reduced set of radio access functionality is supported in the ECO state compared to the Active state. At least some degree of connectivity to RAN 125 is supported in both states, such that UE 104 maintains an always-on connection to the RAN 125 in respect of both RAN slice 152(S1) and second RAN slice 152(S2). In some embodiments, the UE 110 is configured to receive both grant-free and grant based transmissions in the "Active" state, but only "grant-free" transmissions in the "ECO" state, and the UE 110 uplinks status information more frequently and on a different channel in the Active state relative to the ECO state.

Accordingly, a UE 110 that supports a per slice state machine can simultaneously operate in the same state for both RAN slices 152(S1) and 152 (S2) (for example Active state for both slices or ECO state for both slices) or in different states (for example Active state for one slice and ECO state for the other slice). In example embodiments, multiple states or different numbers of states may be supported for different RAN slices 152. In example embodiments, information defining if and what states are supported in a slice are specified in the AP/UE functionality parameter set 174 (see FIG. 2).

In another embodiment, a UE is connected to different RAN slices. The first slice can support a service such as eMBB, while the second supports a service that does not necessarily require the same level of connection reliability, such as an MTC service. While within the first slice, the UE may be in one of an Active or Idle state, within the MTC slice, the UE may be in any of an Active, Idle or ECO state. Normally, an MTC device may perform some grant-free or contention-based transmissions from an ECO state, and only enter the active state when there is a scheduled transmission window, or a pre-scheduled downlink transmission. The physical UE may allow for the MTC slice to perform transmissions without requiring transition out of an IDLE state, if it is in the active state within the eMBB slice. This can allow the MTC slice or process within the UE to take advantage of the active state of another portion of the UE.

It should be understood that although the above discussion has made reference to having a slice for each service, it may be more practical for the network to provide a limited number of slices, with each slice serving a number of different services that have sufficiently similar properties. In one example, a variety of different content delivery networks could co-exist in a single RAN slice.

Figure 7:
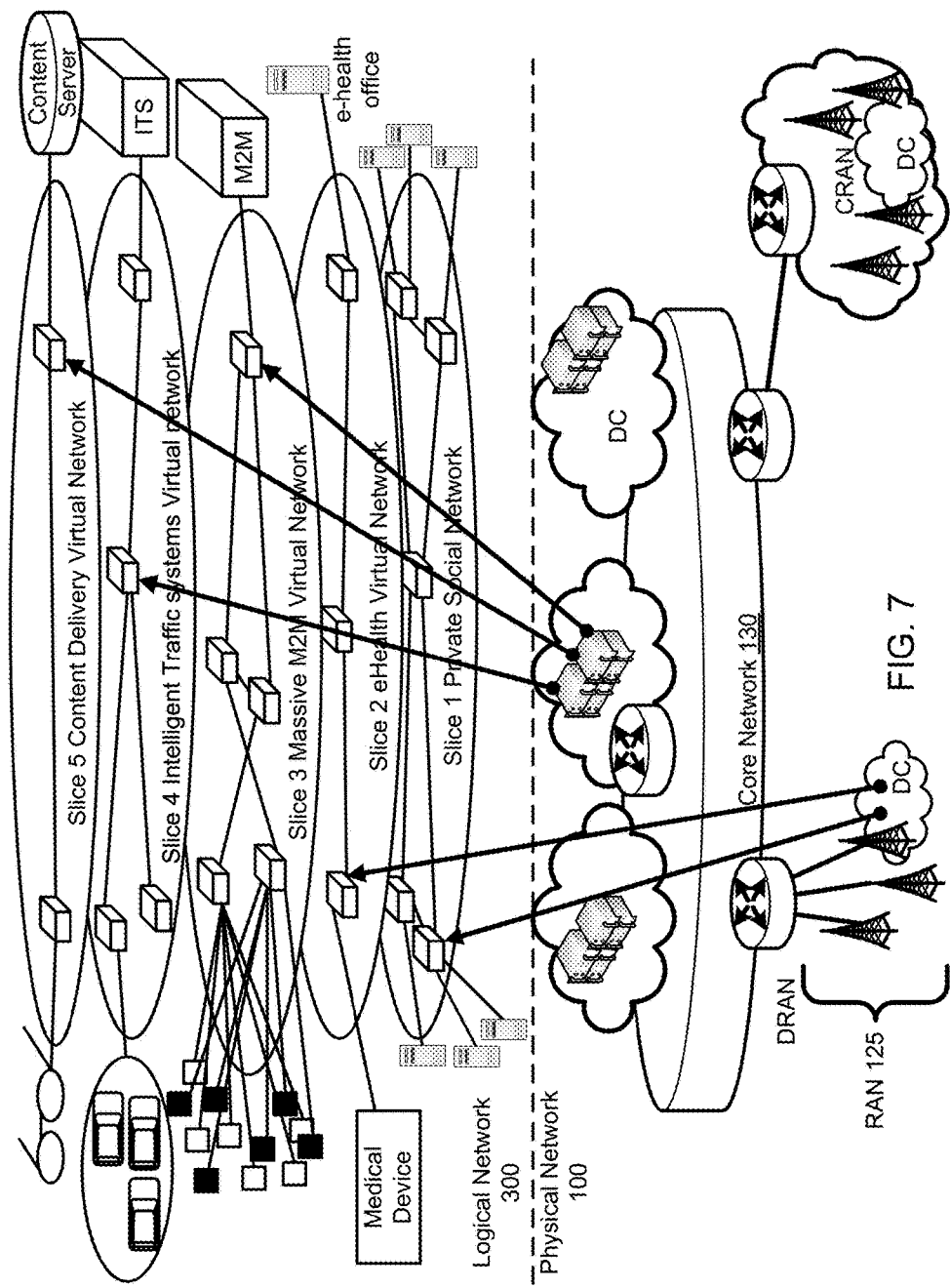
FIG. 7 is a schematic diagram, illustrating service customized virtual networks implemented using slices according to example embodiments.

In the core network, it may be possible to provide each of the network supported services with their own slice, and have this slice associated with a corresponding RAN slice such that end-to end slice management can be carried out under the control of slice manager 130. In this regard, FIG. 7 schematically illustrates a Service Customized Virtual Network (SCVN) implementation in which Slices 1-Slice 5 are each implemented as a virtual network that extends through core network 130 and RAN 125. In an example embodiment, slice manager 130 exchanges information with each of core slice manager 140 and RAN slice manager 150 to create end-to-end service-centric Slices 1-Slices-5. Each of Slices 1 to Slices-5 includes a resource set for the core network that defines an associated core network slice and a resource set for RAN 125 that devices an associated RAN slice 152.

In embodiments in which both core and RAN slicing occur, resource allocation manager 115 (under instructions from Slice Manager 130) can ensure that traffic received in a slice from RAN 125 is provided to a virtualized decoder that is connected to the corresponding slice in the Core network 130. This ensures that as data is received from a UE 110 device, isolation is maintained as the decoding can take place within the appropriate network slice instead of at the common radio access point.

Figure 8:
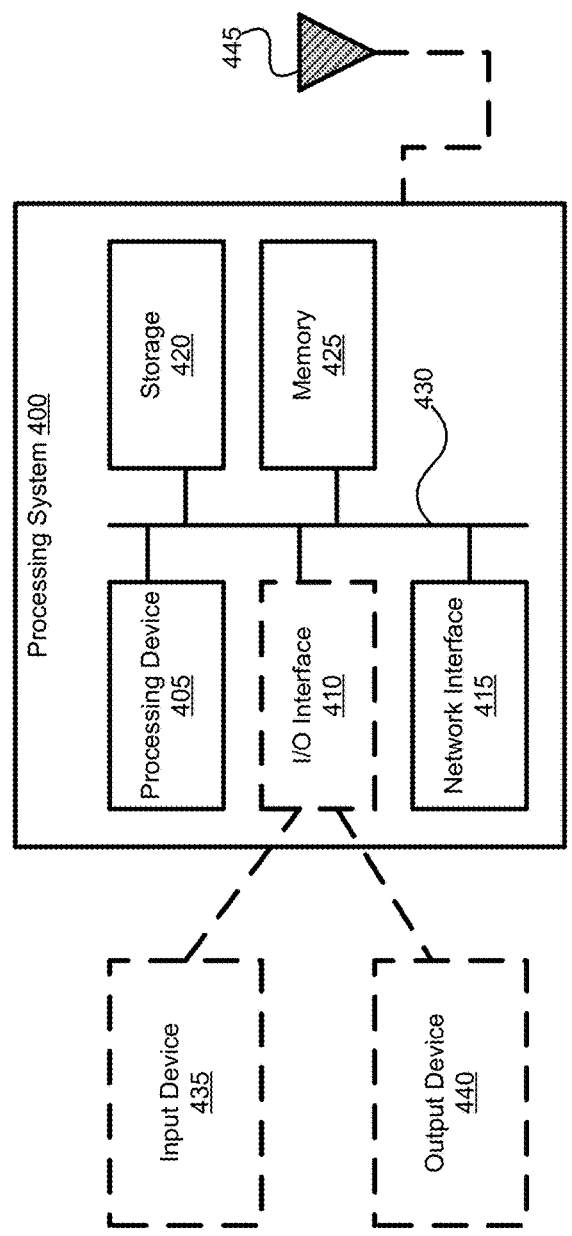
FIG. 8 is a schematic diagram of an example processing system suitable for implementing various examples described in the present disclosure.

FIG. 8 is a schematic diagram of an example simplified processing system 400, which may be used to implement the methods and systems disclosed herein, and the example methods described below. The UE 110, AP 105, Resource Allocation Manager, Scheduler 120, slice manager 130, core network slice manager 140 and/or RAN slice manager may be implemented using the example processing system 400, or variations of the processing system 400. The processing system 400 may be a server or a mobile device, for example, or any suitable processing system. Other processing systems suitable for implementing examples described in the present disclosure may be used, which may include components different from those discussed below. Although FIG. 8 shows a single instance of each component, there may be multiple instances of each component in the processing system 400.

The processing system 400 may include one or more processing devices 405, such as a processor, a microprocessor, an application-specific integrated circuit (ASIC), a field-programmable gate array (FPGA), a dedicated logic circuitry, or combinations thereof. The processing system 400 may also include one or more optional input/output (I/O) interfaces 410, which may enable interfacing with one or more appropriate input devices 435 and/or output devices 440. The processing system 400 may include one or more network interfaces 415 for wired or wireless communication with a network (e.g., an intranet, the Internet, a P2P network, a WAN and/or a LAN) or other node. The network interfaces 415 may include one or more interfaces to wired networks and wireless networks. Wired networks may may use of wired links (e.g., Ethernet cable), while wireless networks, where they are used, may make use of wireless connections transmitted over an antenna such as antenna 445. The network interfaces 415 may provide wireless communication via one or more transmitters or transmit antennas and one or more receivers or receive antennas, for example. In this example, a single antenna 445 is shown, which may serve as both transmitter and receiver. However, in other examples there may be separate antennas for transmitting and receiving. In embodiments in which processing system is a network controller, such as an SDN Controller, there may be no wireless interface, and antenna 445 may not be present in all embodiments. The processing system 400 may also include one or more storage units 420, which may include a mass storage unit such as a solid state drive, a hard disk drive, a magnetic disk drive and/or an optical disk drive.

The processing system 400 may include one or more memories 425, which may include a volatile or non-volatile memory (e.g., a flash memory, a random access memory (RAM), and/or a read-only memory (ROM)). The non-transitory memories 425 (as well as storage 420) may store instructions for execution by the processing devices 405, such as to carry out methods such as those described in the present disclosure. The memories 425 may include other software instructions, such as for implementing an operating system and other applications/functions. In some examples, one or more data sets and/or modules may be provided by an external memory (e.g., an external drive in wired or wireless communication with the processing system 400) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 430 providing communication among components of the processing system 400. The bus 430 may be any suitable bus architecture including, for example, a memory bus, a peripheral bus or a video bus. Optionaly input devices 435 (e.g., a keyboard, a mouse, a microphone, a touchscreen, and/or a keypad) and output devices 440 (e.g., a display, a speaker and/or a printer) are shown as external to the processing system 400, and connected to optional I/O interface 410. In other examples, one or more of the input devices 435 and/or the output devices 440 may be included as a component of the processing system 400. Embodiments in which processing system 400 is a network controller may lack a physical I/O interface 410, and instead may be a so-called headless server for which all interactions are carried out through a connection to network interface 415.

In example embodiments, a processing system 400 configured to implement RAN slice manager 150 may be configured to maintain information that specifies the resource allocations for each of RAN slices 152 in memory 425 or storage 420 or a combination thereof.

Figure 9:
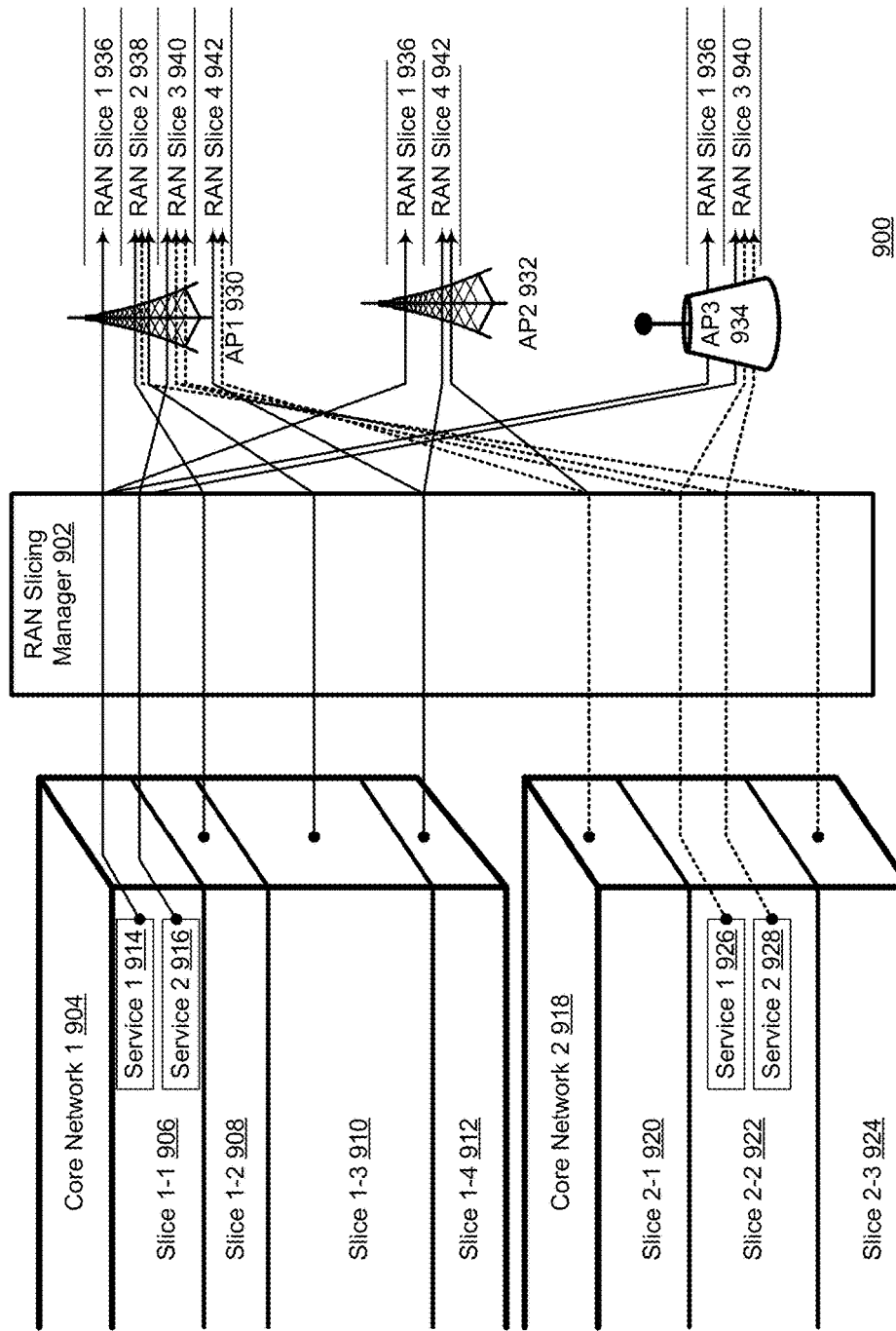
FIG. 9 is an illustration of an architecture for routing traffic from a Core Network Slice to a RAN slice in accordance with disclosed embodiments.

FIG. 9 illustrates an architecture 900 in which a sliced RAN interacts with a plurality of Core Network Slices. A RAN slicing manager 902 establishes traffic routes, and may be used to direct traffic from a CN slice to the appropriate TPs based on at least an identification of the CN slice, and in some cases in accordance with a service ID associated with a service carried by the slice. CN1 904 has been sliced to create 4 slices, slice 1-1 906, slice 1-2 908, slice 1-3 910 and slice 1-4 912. Each of the slices of CN1 904 carry traffic, and slice 1-1 906 is illustrated as carrying traffic associated with service 1 914, and service 2 916. CN2 918 has 3 slices, CN2-1 920, CN 2-2 922, and CN 2-3 924. Each slices carried traffic, and slice 2-2 922 is illustrated as carrying traffic for service 1 926 and slice 2 928. It should be understood that service 1 914 and service 1 926 are not necessarily the same service. If they each carry the same service ID, they may be differentiated based on the slice or even the CN from which they arrive. RSM 902 is illustrated as a discrete element for the purposes of ease of illustration in the figure. As will be apparent to those skilled in the art, the functions described can be incorporated into other elements, such as a set of routers that have been given routing instructions by an SDN controller.

Radio Access Nodes, such as basestations etc, have typically not performed slicing of the Radio interface. At best, static partitioning of time or frequency based rwesources has been employed to create virtual channels. As indicated above, slicing of the RAN can also be accomplished through the use of different waveforms, numerologies and transmission parameters. In a RAN, a plurality of APs may provide overlapping coverage areas. Some APs may be associated with all slices, other APs may be associated with a single slice, and still other APs may be associated with a subset of the slices. FIG. 9 illustrates 3 APs within the RAN, AP1 930, AP2 932 and AP3 934. As will be appreciated different types of AP can be used for different purposes. AP1 930 supports 4 different RAN slices, RAN slice 1 936, RAN slice 2 938, RAN slice 3 940 and RAN slice 4 942. AP2 932 supports two of the four RAN slices, RAN slice 1 936 and RAN slice 4 942. AP 3 934 supports RAN slice 1 936 and RAN slice 3 940.

As traffic from the two CNs, is received within the RAN, RAN slicing manager 902 directs traffic on the basis of the CN, CN slice and service, to the respective RAN slice. As illustrated, service 1 914 within slice 1-1 906 is directed to RAN slice 1 936. Thus traffic from this service can be sent to all three of AP1 930 AP2 932 and AP3 934. Traffic from service 2 916, which is also traffic from slice 1-1 906, is transmitted over RAN slice 3 940, so RAN slice Manager 902 directs this traffic to AP1 930 and AP 3 934. Those skilled in the art will appreciate that as discussed earlier different services may carry the same service ID if they are within different CN slices. This may be a result of different service providers not knowing the service ID values used in other slices. Because the slice ID and even in some cases a core Network ID can be associated with traffic, the RAN slicing Manager can ensure that service 1 926 carried within slice 2-2 922 can be routed to RAN slice 3 940. As a manner of aiding in visual distinction, traffic from CN 1 904 is shown traversing a path indicated by a solid line, while traffic from CN 2 918 is shown traversing a path indicated by a dashed line.

Traffic from slice 1-2 908 is carried by RAN slice 2 938; traffic from slice 1-3 910 is carried by RAN slice 2 938; traffic from slice 1-4 912 is carried by RABN slice 4 194. Traffic from slice 2-1 920 is carried by RAN slice 2 938; traffic from both services 926 and 928 within slices 2-2 922 is carried by RAN slice 3 940, and traffic from slice 2-3 924 is carried in RAN slice 2 938.

Figure 10:
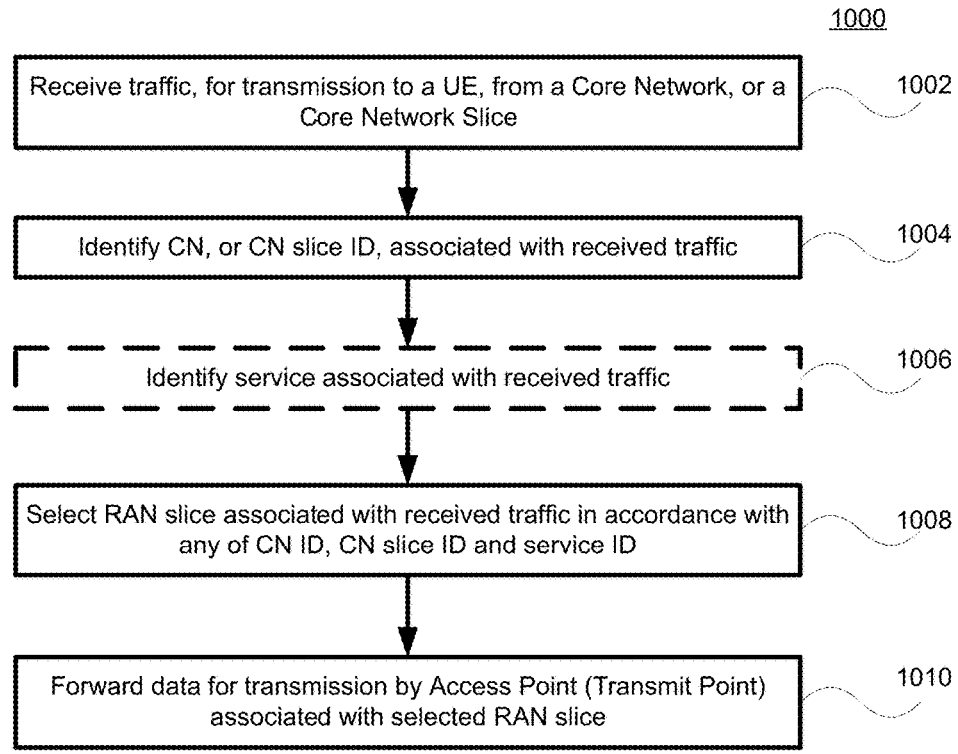
FIG. 10 is a flow chart illustrating a method for routing downlink traffic received from a core network slice to an AP in accordance with disclosed embodiments.

FIG. 10 is a flow chart illustrating a method 1000 of routing downlink traffic at an RSM. Those skilled in the art will appreciate that this functionality may be carried out by routers with a RAN under the instruction of a controller, such as a Software Defined Networking Controller. As illustrated, traffic is received for transmission to a UE in step 1002. This traffic is received from a core network, and may be associated with one or both of a CN slice and a service. Any of the CN and optionally CN slice associated with the received traffic is identified in step 1004. In step 1006 a service ID associated with the traffic can optionally be identified. As will be understood, in the network of FIG. 9, the service ID for traffic from slice 1-1 906 has to be identified so that it can be differentially routed, while the service ID for traffic from slice 2-2 922 is not necessarily required because traffic from both slices is routed to the same RAN slice. In step 1008, a RAN slice associated with the identified CN, CN slice, and service ID (as appropriate) is selected. Data for transmission to a UE is then routed to the appropriate TP (which may be an AP) in accordance with the identified RAN slice in step 1010. A RAN slice ID may be associated with the traffic so as to aid the TP with selection of the transmission parameters. In other embodiments, the TP can be left to determine which of the RAN slices it supports the traffic should be transmitted over. As will be well understood by those skilled in the art, mobile networks are typically designed to allow for mobility of the connected UE. Thus, routing data to the appropriate TP after selecting the RAN slice may include selecting a TP based on information provided by a mobility management function that tracks the location of the UE with respect to the topology of the network. In another embodiment, the TP may be a logical entity composed of a changing set of physical APs that are selected to track the location of the UE. In such an embodiment, the TP may be uniquely associated with a UE, and forwarding the data to a TP may be a function of selecting a TP associated with the UE and determining the set of APs currently associated with the TP. Data can then be transmitted (using any number of techniques including a multicast transmission) to the constituent APs within the selected TP.

Figure 11:
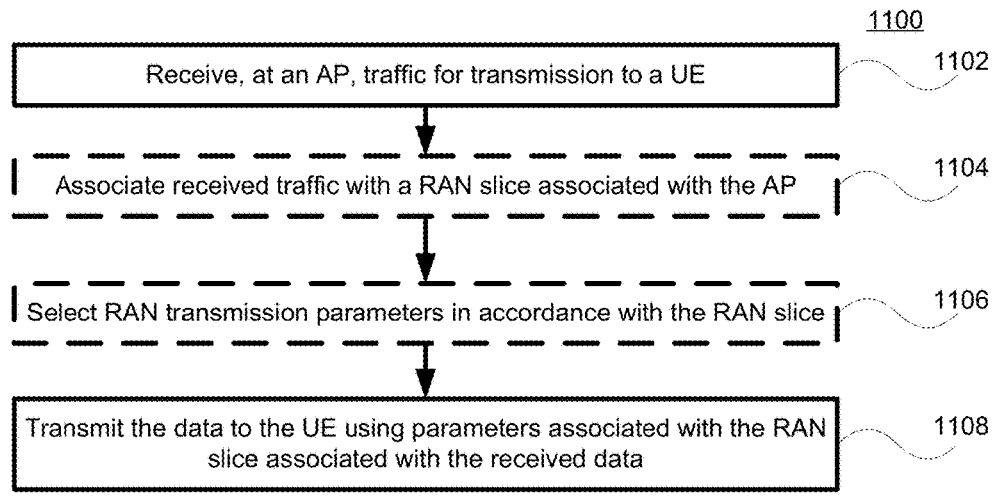
FIG. 11 is a flow chart illustrating a method for execution by an access point in accordance with disclosed embodiments.

FIG. 11 is a flow chart illustrating a method 1100 for handling downlink traffic at an AP (optionally a TP). Traffic for transmission to a UE is received at an AP in 1102. Optionally, the received traffic is associated with a RAN slice that is supported by the AP in 1104. This may have been previously performed in the RAN, in which case is does not need to be redone. The association with a RAN slice can be carried out in accordance with any number of different identifiers, including a core network ID, a core network slice ID, a service ID, or as will be discussed in FIG. 12 a tunnel ID or gateway address. In step 1106, the AP can select RAN transmission parameters in accordance with the RAN slice. If an AP only supports a single slice this step does not need to be performed, nor would it need to be performed if the parameters are otherwise provided to the AP. In step 1108, the data is transmitted to the UE using the parameters associated with the RAN slice that the data is associated with. As will be understood with reference to the above discussion, these parameters can include a specification of f/t resources, a waveform selection, numerology parameters and other such transmission characteristics.

Figure 12:
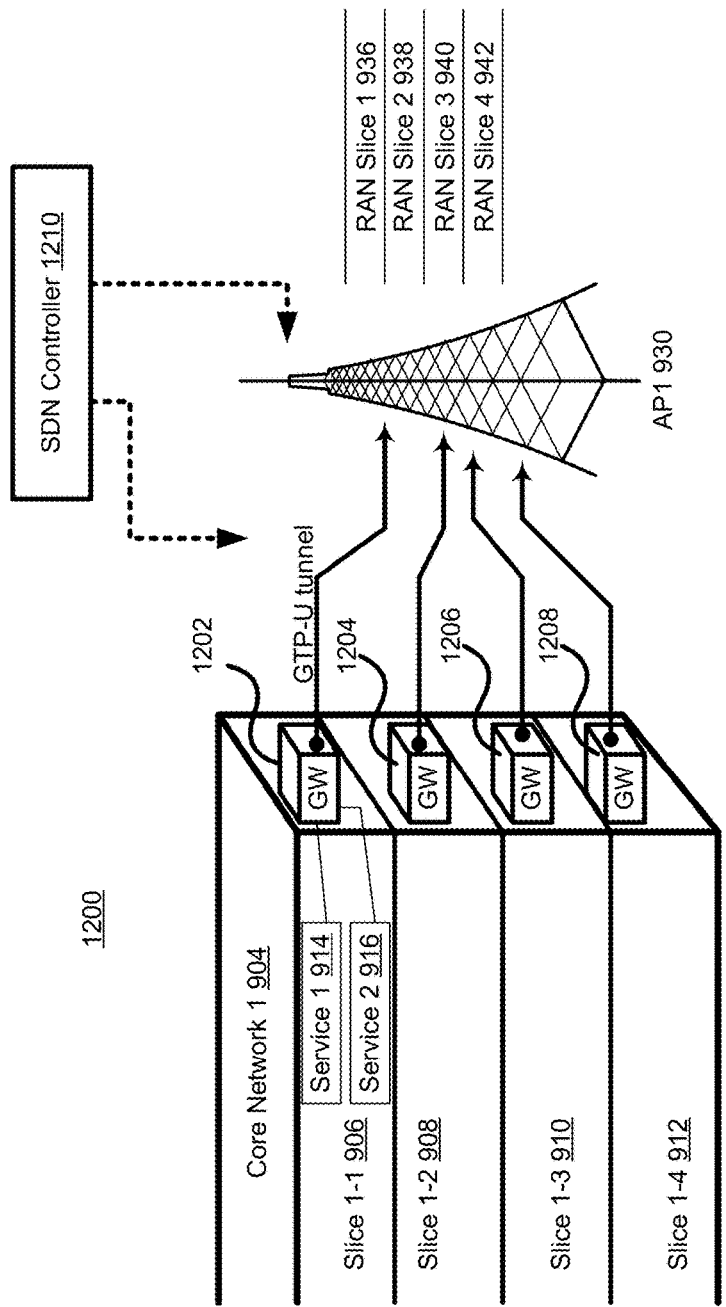
FIG. 12 is an illustration of an architecture, similar to that of FIG. 9, for routing traffic from a core network slice to a RAN slice in accordance with disclosed embodiments.

FIG. 12, illustrates an architecture 1200 associated with the network illustrated in FIG. 9. For ease of explanation, only a single CN is illustrated, and only a single AP is illustrated. CN1 904 is shown connecting to AP1 930. The RAN is sliced to provide RAN slices 1-4 as previously discussed in FIG. 9. It should be understood that within CN Slice 1-1 906 there is a gateway function 1202. This gateway 1202 is the connection points between slice 1-1 906 and the RAN. This means that all traffic from slice 1-1 906, including traffic associated with both service 1 914 and service 2 916, will be sent to the RAN through GW 1202. Similarly, traffic from slice 1-2 908 will be sent through GW 1204, traffic from slice 1-3 910 will be sent through GW 1206 and traffic from slice 1-4 912 will be sent through GW 1208. In the terminology associated with current LTE networks, the traffic from a gateway is sent to AP1 930 using a GPRS Tunneling Protocol (GTP) tunnel, in this case because it is user plane traffic a GTP-U tunnel. This GTP-U tunnel has an identifier associated with it. The GTP-U tunnels, or their analog in future generations of networks, can be designed to route traffic to the APs that support the RAN slice that the CN slice and services are directed to. This setting up of the tunnels can be performed by a controller, such as SDN Controller 1210, and put into effect by transmitting instructions to routing functions within the RAN. Similarly, SDN controller 1210 can provide instructions to AP1 930 to allow it to select the appropriate RAN slice for received traffic in accordance with at least of a tunnel ID associated with the tunnel that the traffic is received over, and an address of the gateway that the traffic is received from. Where a GW or a tunnel is associated with a CN slice that supports services that are routed to different slices, the AP can be instructed to associate traffic based on the CN slice and the service ID (as indicated in FIG. 11 at step 1104).

In the uplink, it will be understood that a UE, such as UE 110 can have a plurality of different virtual machines, each of which is used for the services associated with a different RAN slice. This allows the UE to be associated with different vAPs for each slice, and further allows handovers to happen on a per slice basis. An AP, such as AP 1 930 will receive traffic associated with a RAN slice. This traffic will also carry an indication of the CN or CN slice with which it is associated, and may also include an indication of the CN service it is associated with. This information can be used by the AP to select any of the tunnels that the traffic is transmitted to, the GW to which the traffic is transmitted, and the CN or CN slice that the traffic is to be transmitted to. In accordance with this destination information, the AP can transmit the received data to the associated CN slice. It should be understood that in situations in which there is a one to one mapping between the RAN slice and a CN slice, the AP can direct traffic to a CN slice on the basis of the RAN slice over which it is received. Where a RAN slice supports traffic from a plurality of different CN slices, further information, such as a CN slice ID, or a unique service ID, can be used to make the determination.

Figure 13:
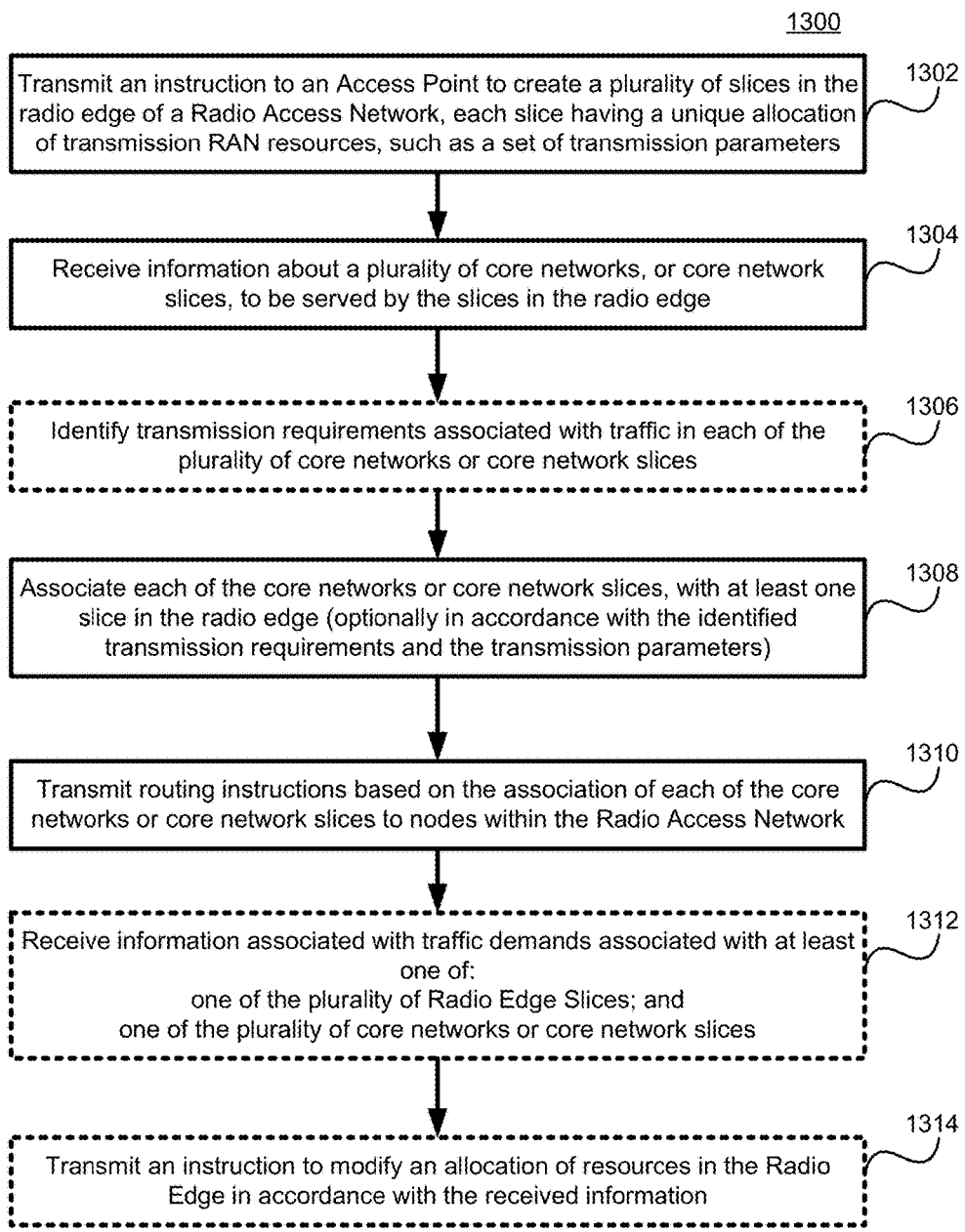
FIG. 13 is a flow chart illustrating a method for execution by a network controller in accordance with disclosed embodiments.

Those of skill in the art will appreciate that in an embodiment of the present invention, there is a method 1300 as illustrated in FIG. 13. The method is directed to the creation of a plurality of RAN slices that can be applied to radio communications in the RAN. Each of the RAN slices can be assigned a unique allocation of RAN resources. The unique allocation provides isolation from transmission in other RAN slices. This allocation of resources can include a unique set of transmission parameters. The method can be carried out at a controller, such as SDN controller 1202. In step 1302, instructions are transmitted to an AP to create a plurality of slices in the radio edge of the RAN. Information about core networks and possibly core network slices that will be served by the RAN slices is received in 1304. This information may include identification of the gateways from which traffic is to be received, and may also include identification of the services carried in the core network(s). This information may also include information about the nature of the traffic in the core network. Optionally, this information is used to determine transmission requirements (e.g. radio edge transmission requirements) in step 1306. In 1308, each of the core networks, or the core network slices, is associated with at least one slice of the radio edge of the RAN. It should be understood that if there are a plurality of different services carried within a core network, or core network slice, there may be more than one slice of the RAN radio edge associated with the core network or core network slice. In 1310, routing instructions based on the association of core networks or core network slices to the RAN slices is transmitted to nodes within the radio access network. This information may be transmitted to APs which are the interface between the radio edge slice and an unsliced portion of the RAN. The routing information may also be transmitted to routing functions within the RAN. These instructions may also be sent to gateway functions at the edge of the core network (or core network slice) and the RAN. The routing instructions may contain information that can be used to establish logical tunnels between the gateways and APs. This can enable a network to operation so that traffic from a core network or core network slice is directed to the APs associated with the radio edge slice assigned to the core network traffic.

In an optional embodiment, information associated with changing traffic demands or requirements for either a core network (or slice) or a radio edge slice is received. This information, received in optional step 1312, may indicate that there is excess capacity, or surplus demand for capacity in the radio edge slices. This information can be used to determine a new resource allocation for the radio edge slices, which can be transmitted to the respective nodes. In some embodiments this instruction may only be transmitted to the APs, or to a subset of APs. In other embodiments, the modification may create new radio edge slices, or remove existing radio edge slices, in which case a modification message (possibly not the same modification message sent to the AP) may be sent to other nodes in the RAN so that logical connections can be created or removed.

In some of the embodiments of the above described method, the RAN resources can include any or all of: network access resources that connect the RAN to a physical core network; radio frequency and time resources of the RAN; and an air interface configuration specifying how the network access resources interface with the radio frequency resources of the RAN. Optionally, at least some of the RAN slices can have common allocations of network access resources and adjacent radio frequency resources, with differentiating air interface configurations being allocated to each of the at least some of the RAN slices to isolate the radio communications of the at least some of the RAN slices from each other. The air interface configurations may specify waveforms for the RAN slices and numerology to apply to the waveforms. The plurality of RAN slices can comprises first and second RAN slices for which the air interface configurations specify the same waveform but different numerologies. In this manner, a numerology can allow a degree of isolation between the slices, as a receiver associated with the first slice would not be able to properly decode data transmitted in the second slice due to the differing transmission numerology. In one such example, the common waveform can be an OFDMA waveform, and the numerologies associated with each slice can have a different combination of one or more of: sub-carrier spacing, cyclic prefix length, symbol length, a duration of a scheduled transmission duration and a number of symbols contained in a scheduled transmission duration.

In another embodiment, different network access resources and different combinations of time and radio frequency resources can be allocated to RAN slices to provide isolation.

Those skilled in the art will appreciate that this method allows for the association of RAN slices with respective core network slices (or services within the core network slices) to enable communications associated with service to use a RAN slice and its associated core slice.

In other embodiments, for at least one of the RAN slices, the network access resources comprise at least one logical transmit point for downlink communications and at least one logical receive point for uplink communications. The TP and RP can be based on different sets of physical access points. In some embodiments, there may be overlap between the membership of physical access points within the logical TP and RP. In other embodiments there may be no overlap. Even if the membership of the physical APs is identical, the assignment of different logical identifiers to a TP and RP associated with a slice create a logical distinction for a UE. It is also possible that a set of physical APs assigned to a TP or RP in one slice may differ from the set of physical APs assigned to a TP or RP in another slice. The membership of the TP or RP in any slice can be changed without informing the UE, so long as the logical TP or RP identifiers are maintained. A UE may be communicating with the same set of physical APs in two different slices without being aware of this overlap.

After the establishment of the slices, and the definition of logical TPs and RPs within each slice, traffic destined for a UE attached to more than one slice can be received and routed to the APs associated with the CN, CN slice, or service, that the traffic is associated with. The traffic can then be transmitted to the UE using the transmission parameters associated with the RAN slice. Traffic associated with a different slice may be transmitted to the UE by a different logical TP, which may or may not have the same physical APs.

When the UE has traffic to transmit, it can transmit the traffic to the RP associated with the slice associated with the respective service. Based on any or all of an identification of the UE, the RP that traffic is received over, a service identifier associated with the transmission, and a destination address, the received traffic can be routed to the appropriate core network or core network slice.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for execution by an access point (AP) within a radio access network (RAN), the method comprising:
   receiving, by the AP, data for transmission to a User Equipment (UE); and
   wirelessly transmitting, by the AP, the received data to the UE using a set of transmission parameters associated with a RAN slice associated with the received data, wherein the RAN slice is selected from a set of RAN slices supported by the AP and the UE to enable the AP to provide different services for the UE using a common carrier, the transmission parameters associated with the RAN slices in the set of RAN slices including: (i) a respective frequency sub-band assignment within a frequency band of the common carrier; and (ii) a respective air interface configuration enabling the different services provided by the AP to the UE to be isolated from each other within the frequency band of the common carrier.

2. The method of claim 1 wherein the RAN slice is selected in accordance with a RAN slice identifier associated with the received data.

3. The method of claim 1 further comprising selecting the transmission parameters in accordance with the selected RAN slice.

4. The method of claim 1 wherein the RAN slice is selected in accordance with an address of a gateway between the RAN and a core network.

5. The method of claim 1 wherein the RAN slice is selected in accordance with one of a core network identifier, a core network slice identifier and a service identifier associated with the received data.

6. The method of claim 1 wherein the air interface configuration associated with each RAN slice specifies one or more of: (i) transmission wave-form type; (ii) transmission wave-form parameters including one or more of subcarrier spacing, transmission time interval length (TTI), cyclic prefix (CP) length; and (iii) multiple access scheme parameters.

7. A network access point (AP) for transmitting data to a User Equipment (UE) over a radio channel in a radio access network (RAN), comprising:
   a network interface for receiving data from the RAN;
   a wireless network interface for transmitting the data to the UE;
   a processor; and
   a non-transient memory for storing instructions that when executed by the processor cause the network access point to:
   transmit data to the UE over the wireless network interface using a set of transmission parameters associated with a RAN slice, in response to receipt of the data for transmission to the UE, wherein the RAN slice is selected from a set of RAN slices supported by the AP and the UE to enable the AP to provide different services for the UE using a common carrier, the transmission parameters associated with the RAN slices in the set of RAN slices including: (i) a respective frequency sub-band assignment within a frequency band of the common carrier; and (ii) a respective air interface configuration enabling the different services provided by the AP to the UE to be isolated from each other within the frequency band of the common carrier.

8. The network access point of claim 7 wherein the non-transient memory further stores instructions to select the set of transmission parameters in accordance with an address of a gateway from which the data is received.

9. The network access point of claim 7 wherein the non-transient memory further stores instructions to select at least one transmission parameter in the set in accordance with a RAN slice identifier associated with the data.

10. The network access point of claim 7 wherein the non-transient memory further stores instructions to select at least one transmission parameter in the set in accordance with one of a core network identifier, a core network slice identifier and a service identifier associated with the data.

11. The network access point of claim 7 wherein the air interface configuration associated with each RAN slice specifies one or more of: (i) transmission wave-form type; (ii) transmission wave-form parameters including one or more of subcarrier spacing, transmission time interval length (TTI), cyclic prefix (CP) length; and (iii) multiple access scheme parameters.

12. A method for execution by a routing function in a radio access network (RAN):
   receiving data traffic from a core network destined for a User Equipment (UE);
   transmitting the received data traffic to a transmission point within a selected RAN slice associated with the received data traffic, where the RAN slice is selected from a set of RAN slices supported by the transmission point and the UE to enable the transmission point to provide different services for the UE using a common carrier, the RAN slices in the set of RAN slices each having a respective set of transmission parameters including: (i) a respective frequency sub-band assignment within a frequency band of the common carrier; and (ii) a respective air interface configuration enabling the different services that are provided by the AP to the UE to be isolated from each other within the frequency band of the common carrier.

13. The method of claim 12 further comprising selecting the RAN slice associated with the received data traffic in accordance with one of:
   an identifier associated with the core network;
   an identifier associated with a slice of the core network associated with the received data; and
   a service identifier associated with the received data.

14. The method of claim 13 wherein the identifier associated with one of the core network and the slice of the core network is one of an address of a core network gateway function and a tunnel identifier.

15. The method of claim 12 wherein receiving the data traffic includes receiving the data traffic from a gateway function within the core network.

16. The method of claim 12 wherein receiving the data traffic includes receiving the data traffic from a core network slice.

17. The method of claim 16 wherein the selected RAN slice is pre-associated with the core network slice.

18. The method of claim 12 further including the step of selecting the transmission point within the RAN slice in accordance with information about the location of the UE with respect to the network topology.

19. The method of claim 12 further comprising:
   selecting a transmission point uniquely associated with the UE; and
   determining a set of constituent access points associated with the transmission point;
   wherein transmitting the received data comprises transmitting the received data to the set of constituent access points.

20. The method of claim 12 wherein the step of transmitting includes modifying the received data to include a RAN slice identifier associated with the selected RAN slice prior to transmitting the data to the transmission point.

21. A router for use in a radio access network (RAN), comprising:
  a network interface for receiving and transmitting data;
  a processor; and
  a non-transient memory for storing instructions that when executed by the processor cause the router to:
  transmit data traffic, over the network interface, to a transmission point associated with a selected RAN slice within the RAN, in response to receiving data traffic destined for a User Equipment (UE) over the network interface, where the RAN slice is selected from a set of RAN slices supported by the transmission point and the UE to enable the transmission point to provide different services for the UE using a common carrier, the RAN slices in the set of RAN slices each having a respective set of transmission parameters including: (i) a respective frequency sub-band assignment within a frequency band of the common carrier; and (ii) a respective air interface configuration enabling the different services that are provided by the AP to the UE to be isolated from each other within the frequency band of the common carrier.

22. The router of claim 21 wherein the non-transient memory contains further instructions that when executed by the processor cause the router to select the RAN slice in accordance with one of an identifier associated with the core network; an identifier associated with a slice of the core network associated with the received data; and a service identifier associated with the received data.

23. The router of claim 22 wherein the identifier associated with one of the core network and the slice of the core network is one of an address of a core network gateway function and a tunnel identifier.

24. The router of claim 21 wherein the non-transient memory contains further instructions that when executed by the processor cause the router to select the transmission point in accordance with information about the location of the UE with respect to the network topology.

25. The router of claim 21 wherein the non-transient memory contains further instructions that when executed by the processor cause the router to
  select a transmission point uniquely associated with the UE;
  determine a set of constituent access points associated with the selected transmission point; and
  transmit the data to the transmission point by transmitting the data to the set of constituent access points.

26. The router of claim 21 wherein the non-transient memory contains further instructions that when executed by the processor cause the router to modify the received data prior to transmission to the transmission point to include a RAN slice identifier associated with the selected RAN slice.

* * * * *